(12) United States Patent
Yamazaki et al.

(10) Patent No.: US 6,778,231 B1
(45) Date of Patent: *Aug. 17, 2004

(54) ELECTRO-OPTICAL DISPLAY DEVICE

(75) Inventors: Shunpei Yamazaki, Tokyo (JP); Akira Mase, Aichi (JP); Masaaki Hiroki, Kanagawa (JP); Yasuhiko Takemura, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/233,145

(22) Filed: Jan. 19, 1999

Related U.S. Application Data

(62) Division of application No. 08/566,897, filed on Dec. 4, 1995, now Pat. No. 5,956,105, which is a division of application No. 08/387,234, filed on Feb. 13, 1995, now Pat. No. 5,784,073, which is a division of application No. 07/897,669, filed on Jun. 12, 1992, now Pat. No. 5,414,442.

(30) Foreign Application Priority Data

Jun. 14, 1991 (JP) ............................................. 3-169306
Jul. 27, 1991 (JP) ............................................. 3-209869

(51) Int. Cl.$^7$ ............................................. G02F 1/136
(52) U.S. Cl. ........................................ 349/43; 349/122
(58) Field of Search ........................... 349/42, 43, 122, 349/106, 138, 47, 48, 143; 257/59, 72; 345/92; 348/751, 761, 766

(56) References Cited

U.S. PATENT DOCUMENTS

| | | |
|---|---|---|
| 4,036,553 A | 7/1977 | Borel et al. |
| 4,066,918 A | 1/1978 | Heuner et al. |
| 4,103,297 A | 7/1978 | McGreivy et al. ...... 350/334 X |
| 4,131,928 A | 12/1978 | Davis et al. |
| 4,239,346 A | 12/1980 | Lloyd |

(List continued on next page.)

FOREIGN PATENT DOCUMENTS

| | | | |
|---|---|---|---|
| EP | 0298255 | 1/1989 | |
| EP | 0 321 073 | 6/1989 | ................. 340/784 |
| EP | 0368260 | 5/1990 | |
| GB | 2164776 | 3/1986 | |
| JP | 49-77537 | 7/1974 | |

(List continued on next page.)

OTHER PUBLICATIONS

1990 IEEE International Solid–State Circuits Conference Digest of Technical Papers; Feb. 16, 1990, San Francisco, CA pp. 220–221, XP000201945, S.N. Lee et al., "A 5×9 Inch Polysilicon Gray–Scale Color Head Down Display Chip".

(List continued on next page.)

*Primary Examiner*—James Dudek
*Assistant Examiner*—Tai Duong
(74) *Attorney, Agent, or Firm*—Eric J. Robinson; Robinson Intellectual Property Law Office

(57) ABSTRACT

A display device including a substrate and at least one thin film transistor formed over the substrate, wherein the thin film transistor includes a semiconductor film. An insulating film including an inorganic material is provided over the thin film transistor. A leveling film including an organic resin is formed over the substrate and covers the thin film transistor. A pixel electrode is formed on the leveling film and is directly connected to the semiconductor film of the thin film transistor through an opening provided in the leveling film, wherein an edge of the organic resin film at a periphery of the opening is round.

79 Claims, 26 Drawing Sheets

U.S. PATENT DOCUMENTS

| | | | |
|---|---|---|---|
| 4,393,380 A | 7/1983 | Hosokawa et al. | |
| 4,427,979 A | 1/1984 | Clerc et al. | |
| 4,455,737 A | 6/1984 | Godejahn, Jr. | |
| 4,468,855 A | 9/1984 | Sasaki | |
| 4,523,189 A | 6/1985 | Takahara et al. | |
| 4,557,036 A | 12/1985 | Kyuragi et al. | |
| 4,559,535 A | 12/1985 | Watkins et al. | |
| 4,646,426 A | 3/1987 | Sasaki | |
| 4,680,580 A | 7/1987 | Kawahara | 350/784 |
| 4,697,887 A | 10/1987 | Okada et al. | |
| 4,709,995 A | 12/1987 | Kuribayashi et al. | |
| 4,746,628 A | 5/1988 | Takafuji et al. | |
| 4,769,338 A | 9/1988 | Ovshinsky et al. | |
| 4,803,536 A | 2/1989 | Tuan | |
| 4,818,077 A | 4/1989 | Ohwada et al. | 350/333 X |
| 4,841,294 A | 6/1989 | Clerc | |
| 4,868,137 A | 9/1989 | Kubota | |
| 4,876,584 A | 10/1989 | Taylor | |
| 4,897,757 A | 1/1990 | Tailliet et al. | |
| 4,900,695 A | 2/1990 | Takahashi et al. | |
| 4,905,066 A | 2/1990 | Dohjo et al. | |
| 4,908,710 A | 3/1990 | Wakai et al. | |
| 4,930,036 A | 5/1990 | Sitch | |
| 4,938,565 A | 7/1990 | Ichikawa | |
| 4,949,141 A | 8/1990 | Busta | 357/23.7 |
| 5,003,356 A | 3/1991 | Wakai et al. | |
| 5,012,228 A | 4/1991 | Masuda et al. | 350/333 |
| 5,017,914 A | 5/1991 | Uchida et al. | |
| 5,051,570 A | 9/1991 | Tsujikawa et al. | 359/59 |
| 5,055,899 A | 10/1991 | Wakai et al. | 359/59 |
| 5,056,895 A | 10/1991 | Kahn | |
| 5,068,748 A | 11/1991 | Ukai et al. | |
| 5,084,905 A | 1/1992 | Sasaki et al. | |
| 5,087,955 A | 2/1992 | Futami | |
| 5,097,311 A | 3/1992 | Iwase et al. | |
| 5,113,181 A | 5/1992 | Inoue et al. | |
| 5,144,392 A | 9/1992 | Brotherton | |
| 5,157,386 A | 10/1992 | Uchida et al. | |
| 5,159,476 A | 10/1992 | Hayashi | |
| 5,159,518 A | 10/1992 | Roy | |
| 5,182,620 A | 1/1993 | Shimada et al. | |
| 5,200,846 A | 4/1993 | Hiroki et al. | |
| 5,200,876 A | 4/1993 | Takeda et al. | |
| 5,204,988 A | 4/1993 | Sakurai | |
| 5,220,443 A | 6/1993 | Noguchi | |
| 5,250,931 A | 10/1993 | Misawa et al. | |
| 5,251,071 A | 10/1993 | Kusukawa et al. | |
| 5,264,839 A | 11/1993 | Kanno et al. | |
| 5,327,001 A | 7/1994 | Wakai et al. | |
| 5,495,353 A | 2/1996 | Yamazaki et al. | 359/59 |
| 5,514,879 A * | 5/1996 | Yamazaki | 257/65 |
| 5,585,949 A | 12/1996 | Yamazaki et al. | |
| 5,612,799 A | 3/1997 | Yamazaki et al. | |

FOREIGN PATENT DOCUMENTS

| | | | |
|---|---|---|---|
| JP | 53-144297 | 12/1978 | 340/784 |
| JP | 55-32026 | 3/1980 | |
| JP | 58-81972 | 7/1981 | |
| JP | 58-32466 | 2/1983 | |
| JP | 58-115864 | 7/1983 | |
| JP | 58-124273 | 7/1983 | |
| JP | 58-158967 | 9/1983 | |
| JP | 59-214262 | 12/1984 | |
| JP | 60-230121 | 11/1985 | |
| JP | 60-262133 | 12/1985 | |
| JP | 61-69036 | 4/1986 | |
| JP | 61-103199 | 5/1986 | |
| JP | 61-141174 | 6/1986 | |
| JP | 62-007167 | 1/1987 | |
| JP | 62-014472 | 1/1987 | |
| JP | 62-124769 | 6/1987 | |
| JP | 62-126677 | 6/1987 | |
| JP | 62-252964 | 11/1987 | |
| JP | 63-10558 | 1/1988 | |
| JP | 63-010558 | 1/1988 | |
| JP | 63-074034 | 4/1988 | |
| JP | 63-082177 | 4/1988 | |
| JP | 63-085586 | 4/1988 | |
| JP | 63-100777 | 5/1988 | |
| JP | 63-107381 | 5/1988 | |
| JP | 63-133124 | 6/1988 | |
| JP | 63-169691 | 7/1988 | |
| JP | 0096636 | 11/1988 | |
| JP | 64-18758 | 1/1989 | |
| JP | 01-30272 | 2/1989 | |
| JP | 64-30272 | 2/1989 | |
| JP | 01-076036 | 3/1989 | |
| JP | 64-68724 | 3/1989 | 340/784 |
| JP | 64-68728 | 3/1989 | |
| JP | 1-130131 | 5/1989 | 340/784 |
| JP | 1-156725 | 6/1989 | |
| JP | 01-165172 | 6/1989 | |
| JP | 1-229229 | 9/1989 | |
| JP | 1-267619 | 10/1989 | |
| JP | 2-51129 | 2/1990 | 340/784 |
| JP | 02-085826 | 3/1990 | |
| JP | 2-188723 | 7/1990 | |
| JP | 02-188723 | 8/1990 | |
| JP | 2-210330 | 8/1990 | |
| JP | 02-210330 | 8/1990 | |
| JP | 2-234134 | 9/1990 | 349/138 |
| JP | 02-277244 | 11/1990 | |
| JP | 2-278749 | 11/1990 | |
| JP | 2-294622 | 12/1990 | |
| JP | 03-002838 | 1/1991 | |
| JP | 03-034434 | 2/1991 | |
| JP | 03-050528 | 3/1991 | |
| JP | 4-186287 | 7/1992 | |

OTHER PUBLICATIONS

Processing of the SID, vol. 31, No. 4, 1990, Los Angeles, CA, pp. 343–347, XP000207744, S. Takahashi et al., "A 10–in.–Diagonal 16–Gray–Level (4096 Color) a–Si TFT–LCD".

Wolf et al., Silicon Processing for the VLSI ERA, Lattice Press, vol. 1, 1989, pp. 151–154.

Wolf et al., Silicon Processing for the VLSI ERA, Lattice Press, vol. 2, pp. 62–72.

Physical Mechanisms of Breakdown in P–N Junctions, J.P. McKelvey, Solid State and Semiconductor Physics, 1971, Sec. 13.3, pp 424–428.

CMOS Cookbook, D. Lancaster, Howard W. Sams & Co., Indianapolis, IN (1977).

The Art of Electronics, Horowitz et al., Cambridge University Press, pp 182–184, 176–177.

* cited by examiner

FIG.12(A) FIG.12(B)  FIG.12(C)
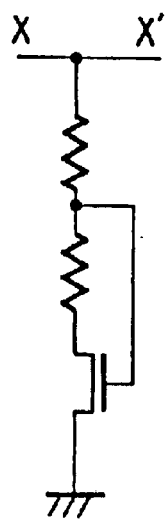
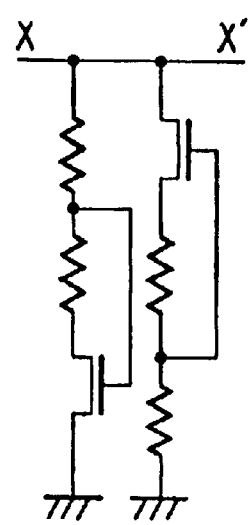
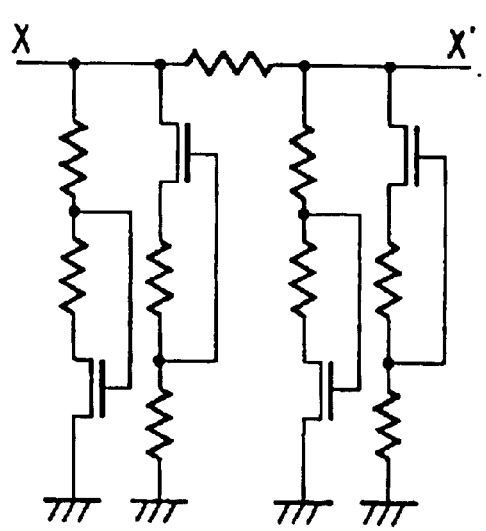
FIG.12(D)  FIG.12(E)
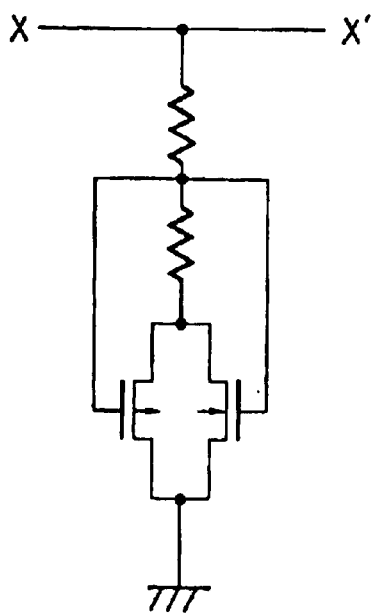
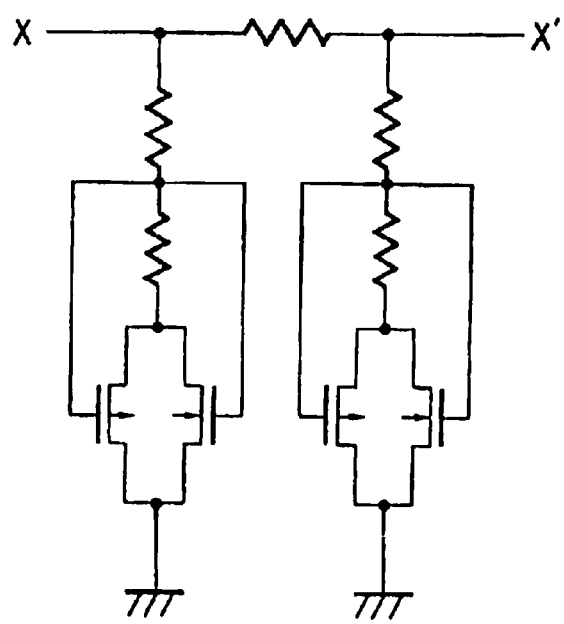

ELECTRO-OPTICAL DISPLAY DEVICE

This application is a Divisional application of Ser. No. 08/566,897, filed Dec. 4, 1995, U.S. Pat. No. 5,956,105 which is a Divisional application of Ser. No. 08/387,234, filed Feb. 13, 1995, now U.S. Pat. No. 5,784,073, which is a Divisional application of Ser. No. 07/897,669, filed Jun. 12, 1992, now U.S. Pat. No. 5,414,442.

BACKGROUND OF THE INVENTION

1. Field of the Invention

The present invention relates to an electro-optical device and a method of driving the same, and, in particular, to the method of gradation image display for obtaining the expression having neutral color tone or intermediate brightness, by utilizing a thin film transistor (hereinafter referred to as TFT) as a switching device for driving. The present invention relates, in particular, to the complete digital gradation display for performing a gradation display without applying any external analog signal to an active device.

2. Description of the Prior Art

A liquid crystal composition can easily be oriented in a parallel direction or in a vertical direction to an external electric field existing outside thereof, because the dielectric constant of the liquid crystal composition in a direction parallel to the molecule axis thereof is different from that in a direction vertical to the molecule axis. The ON/OFF display, i.e. the display in a degree of brightness, is carried out by taking advantage of the anisotropy in dielectric constant, and whereby controlling the amount of transmitted light or the degree of light dispersion. As a liquid crystal material, TN (twisted nematic) liquid crystal, STN (super-twisted nematic) liquid crystal, ferroelectric liquid crystal, antiferroelectric liquid crystal, polymer liquid crystal or dispersion liquid crystal are conventionally known. It is known that it takes a certain period of time before a liquid crystal responds to an external voltage, rather than an infinitely short period of time. The value of the response time is proper to each liquid crystal material: in case of TN liquid crystal, it is several 10 msec, while in case of STN liquid crystal, it is several 100 msec, and in case of ferro-electric liquid crystal, it is several 10 microsec, while in case of dispersion or polymer liquid crystal, it is several 10 msec.

Of the electro-optical device utilizing liquid crystal, a method of obtaining the most excellent image quality is the one taking advantage of an active matrix method. In case of a conventional active matrix type liquid crystal electro-optical device, a thin film transistor (TFT) was used as an active device, while amorphous or polycrystalline semiconductor was used for TFT, and either P-type or N-type TFT is utilized for one picture element. Namely, an N-channel TFT (also referred to as NTFT) is generally connected to a picture element in series. The NTFTs are provided at the intersections of the signal lines arranged in a matrix form. The ON/OFF of a liquid crystal picture element is controlled by taking advantage of the fact that a TFT is turned in an ON state when signals are applied to the TFT through the two signal lines connected thereto. By thus controlling the picture element, a liquid crystal electro-optical device of large contrast can be achieved.

In case of the active matrix method as mentioned above, however, gradation display of brightness or color tone was very hard to carry out. Actually, a method utilizing the fact that the light transmission of liquid crystal is varied dependent upon the level of voltage applied thereto, was under examination. This meant, for example, that a proper level of voltage was supplied between the source and the drain of the TFT in a matrix, from a peripheral circuit, and that the same level of voltage was applied to a liquid crystal picture element by applying a signal voltage to a gate electrode under the condition.

In case of the abovementioned method, however, the voltage actually applied to the liquid crystal differed by at least several % in individual picture elements, owing to inhomogeneity of the TFT or to the inhomogeneity of a matrix wiring. On the other hand, the voltage dependency of light transmission of a liquid crystal has an extremely strong non-linear characteristic, and light transmission would drastically differs for the difference even by several %, for the light transmission changes drastically at a certain voltage. For this reason, a 16 gradation was practically an upper limit.

For example, a voltage range of so-called transition region, that is a voltage range in which light transmission varies from ON state to OFF state, is 1.2 V in case of TN liquid crystal material. Hence, in order to achieve 16 gradations, a minute control of 75 mV voltages which are quotients of 1.2 V divided by 16 is necessary and production yield has been extremely low.

The difficulty in carrying out gradation display was an enormous drawback of a liquid crystal display device in terms of competitiveness with a CRT (cathode-ray tube) as a conventional and general display device.

BRIEF SUMMARY OF THE INVENTION

An object of the present invention is to propose a novel display device having a thin film transistor formed over a substrate. According to the present invention, an insulating film including an inorganic material is provided over the thin film transistor, and a leveling film including an organic resin is formed over the substrate and covers the thin film transistor. Further, a pixel electrode is formed on the leveling film and is connected to a semiconductor film of the thin film transistor through an opening provided in the leveling film, in which an edge of the leveling film at a periphery of the opening is rounded, and a surface of the pixel electrode is rounded along the rounded edge of the leveling film.

BRIEF DESCRIPTION OF THE DRAWINGS

FIGS. 12(A)–(E) show examples of protection circuits.

DETAILED DESCRIPTION OF THE PREFERRED EMBODIMENTS

As mentioned supra, the light transmission of a liquid crystal can be controlled by controlling the voltage to be applied thereto, in an analog mode, whereas the inventors have confirmed that a gradation can be obtained visually by controlling the duration of voltage applied to a liquid crystal.

Figure 1:
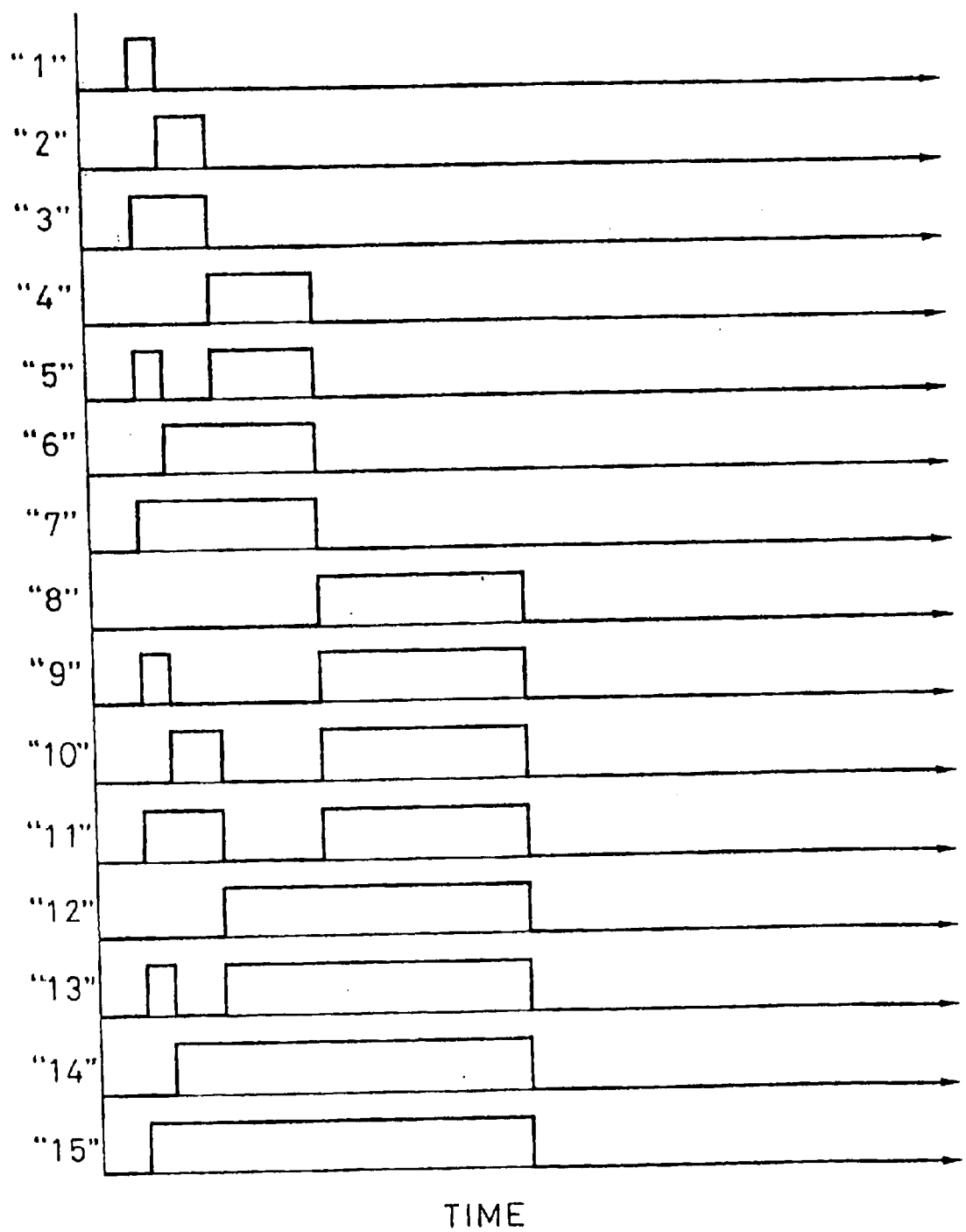
FIG. 1 shows an example of a drive waveform in accordance with the present invention.

For example, in case of using a TN (twisted nematic) liquid crystal which is typically used as a liquid crystal material, it has been confirmed that the brightness can be varied by applying waveform voltages as shown in FIG. 1 to a liquid crystal picture element designed to be in a normally black mode, i.e. non-light-transmittable state or a black state, with no voltage applied to the picture element. Namely, it will be gradually brighter in the order of numerals "1", "2", . . . "15", as shown in FIG. 1. In this way, a 16 gradation display is possible according to the example shown in FIG. 1. In case of a normally white mode, which is a reverse mode of the normally black mode, and which is a light transmittable state with no voltage applied, the numeral "1" should be the brightest while "15" the darkest.

At this time, a pulse of the length of one unit is applied at "1", while a pulse of the length of two units is applied at "2". At "3", a one unit pulse and a two units pulse are applied, and thus a pulse of the length of three units is applied. At "4", a pulse of the length of four units is applied, while, at "5", a one unit pulse and a four-unit pulse are applied. At "6", a two-unit pulse and a four-unit pulse are applied. By preparing a pulse of the length of eight units, a pulse of the length of 15 units can consequently be obtained.

The display of $2^4=16$ gradations will be achieved by properly coupling four kinds of pulses of one unit, two-unit, four-unit, and eight-unit, with each other. Further, advanced gradation display of 32-gradation, 64-gradation, 128-gradation, and 256-gradation will be achieved by preparing pulses of 16-unit, 32-unit, 64-unit, and 128-unit, respectively. In order to obtain a 256 gradations display, for example, eight kinds of pulses are to be prepared.

As a suitable liquid crystal material in accordance with the present invention, TN (twisted nematic) liquid crystal; STN (super twisted nematic) liquid crystal, ferroelectric liquid crystal, antiferroelectric liquid crystal, and dispersion or polymer liquid crystal, and so on, are to be used. The pulse width of on unit will be somewhat different for different liquid crystal materials as mentioned supra: it has been confirmed that the suitable pulse width for TN liquid crystal is no less than 10 nsec and no more than 100 msec.

Figure 5:
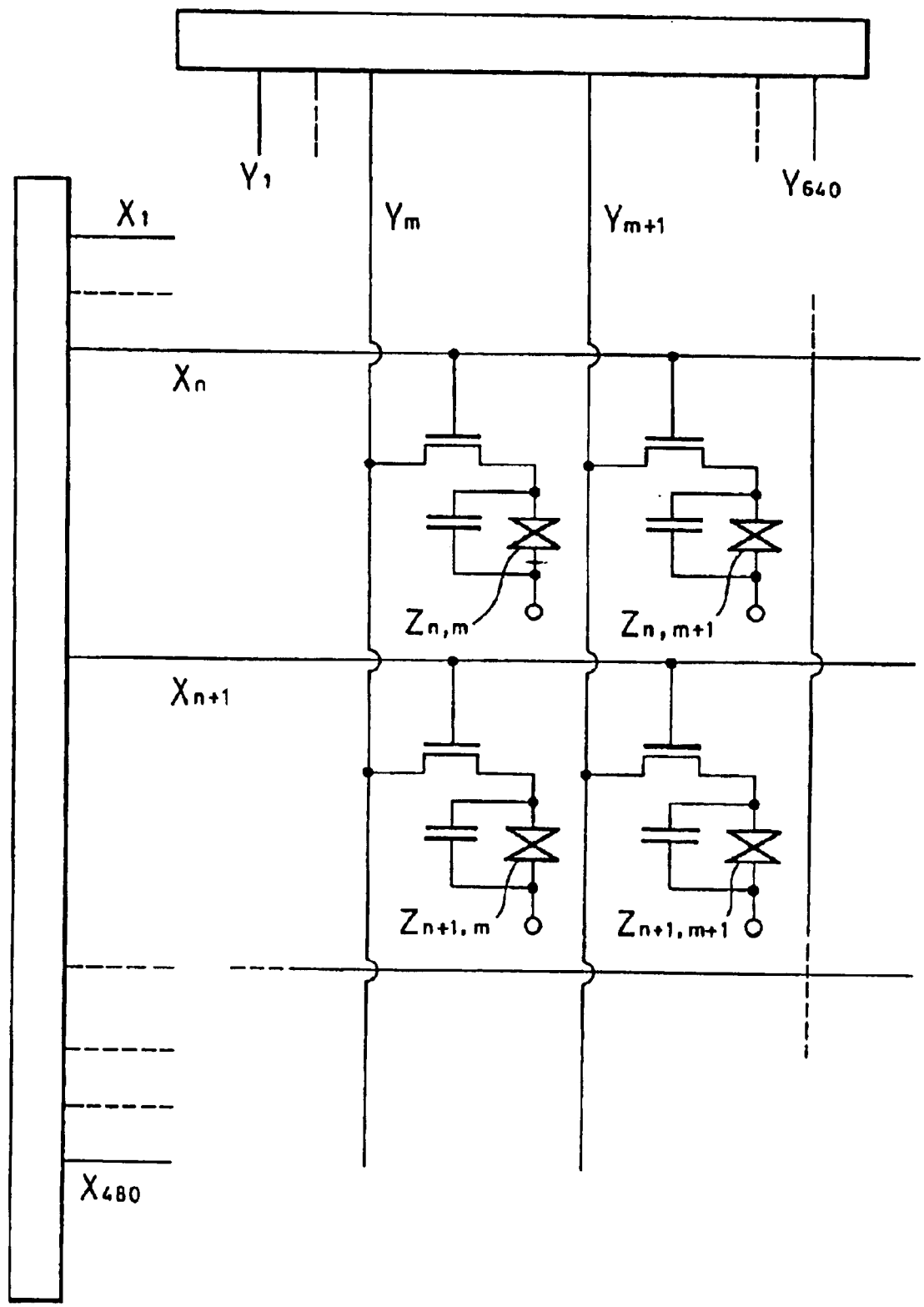
FIG. 5 shows an example of a matrix form in accordance with the present invention.
Figure 6:
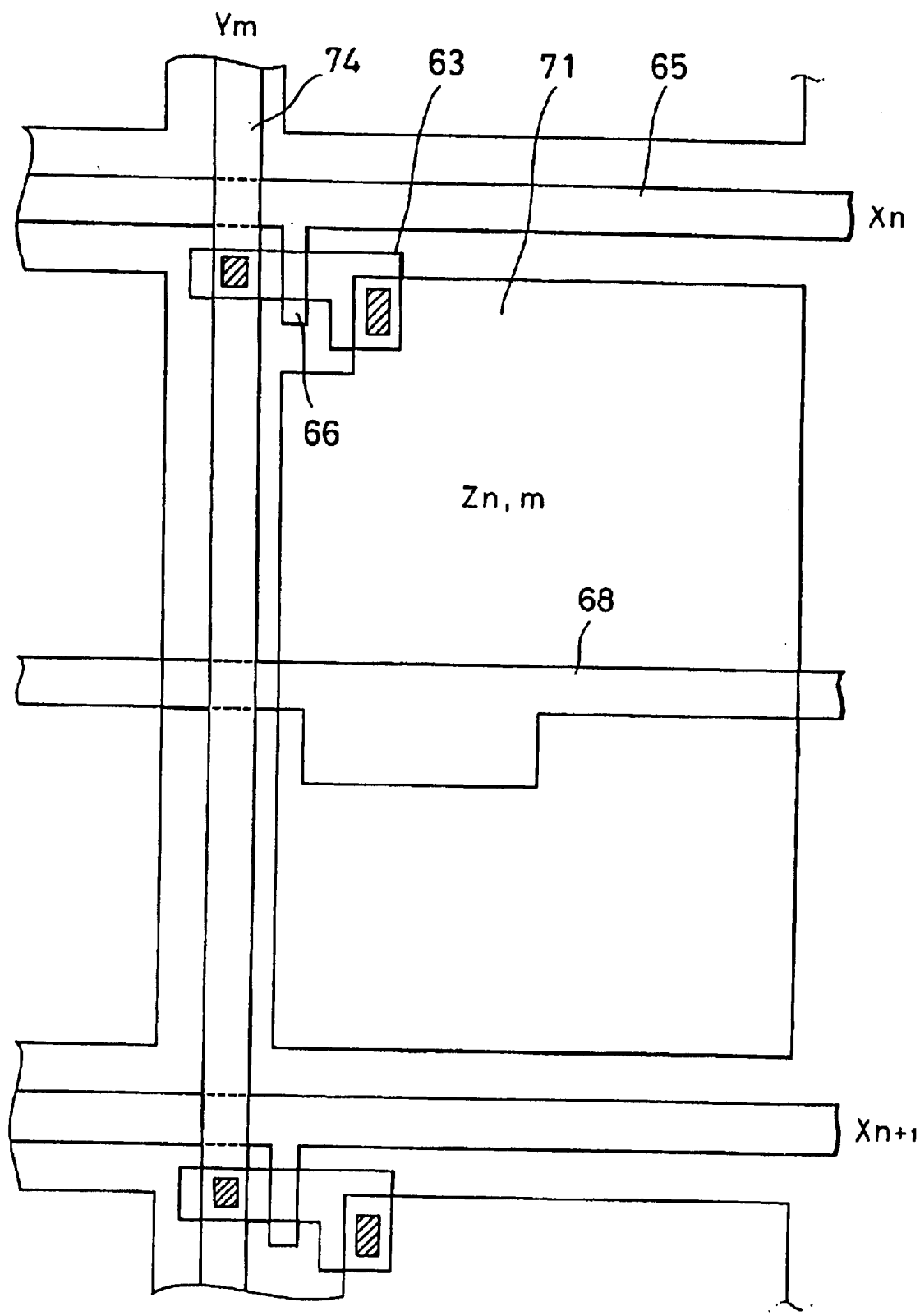
FIG. 6 shows a schematic diagram of a device in accordance with the preferred embodiment.

In order to implement the present invention, for example, a matrix circuit (an active matrix device) utilizing a thin film transistor as shown in FIG. 5 is to be formed. The circuit shown in FIG. 5 is the same as the one used for an active matrix display device utilizing a conventional TFT. An example of one picture element of such an active matrix display device is shown in FIG. 6. Referring to this figure, a region 63 designates, for example, a NTFT or PTFT comprising polysilicon, while an electrode 66 is a corresponding gate electrode. A wiring 65 is a gate wiring, which serves as X-line, while a wiring 74 is connected with the source of TFT, and serves as Y-line. A wiring 68 is for forming a capacitor shown in FIG. 5, which is provided under a picture element electrode 71 through an insulator.

Referring to FIG. 5, a capacitor is intentionally inserted in parallel with the capacitor of a picture element. The capacitor thus inserted has the effect of suppressing the reduction in the voltage of the picture element due to natural discharge of the picture element, while it has also the effect of suppressing the fluctuation of the electric potential of a picture element electrode due to the fluctuation of the electric potential of X-line, caused by the capacitive coupling of the picture element electrode and the X-line through the parasitic capacity generated between a gate electrode and a drain region.

With regard to the latter effect, in particular, the degree of electric potential fluctuation is approximately proportional to the parasitic capacity between a gate and source or drain in an approximation, and inverse-proportional to the capacity of a liquid crystal picture element. The capacity of a picture element can be controlled relatively easily with a liquid crystal display device, whereas the difference in parasitic capacity tends to be widened, and, when the capacity of a liquid crystal picture element is small, as in the case when the area of a liquid crystal unit picture element is small, the influence of the difference in the parasitic capacity of a gate would be so large that the brightness would be completely at random for each picture element. This problem is critical when a gradation display is to be performed on the presumption that the voltage applied to a picture element and the duration thereof are stable, particularly, for the implementation of the present invention. It is thus important, to increase the apparent capacity of a liquid crystal picture element by inserting capacity in this manner, and to reduce the fluctuation of the electric potential of the liquid crystal by suppressing the effect of the parasitic capacity of a gate.

A stable actuation of good reproducibility can be achieved without inserting this kind of intentional capacitor, by including an organic ferroelectric material such as tetrafluoroethylene, polyvinylidene fluoride in a picture element of such as a liquid crystal cell so as to increase the electrostatic capacity of the picture element, and whereby increasing the time constant of the discharging of the picture element.

It is not preferred, however, to add excessive capacity, since the adding of the capacitor in this way can lead to a reduction in operational velocity. The level of the capacity to be added should be around 10–100 times as large as the parasitic capacity of a gate, or several to 100 times as large as, or preferably no more than 10 times of the capacity proper to a liquid crystal picture element.

Figure 2:
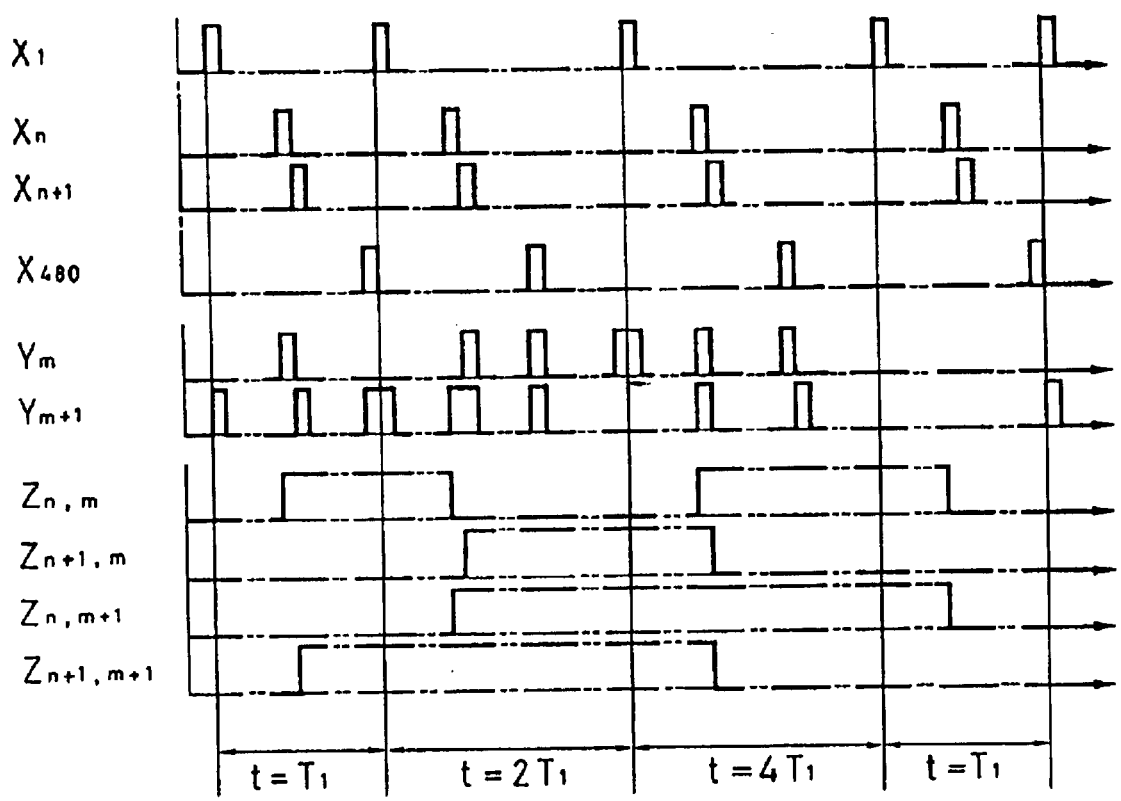
FIG. 2 shows an example of a drive waveform in accordance with the present invention.

In the circuit as described above, the ON/OFF control of the voltage applied to a picture element can be achieved by controlling the gate voltage of each thin film transistor, and the voltage between the source and drain. In this example, a matrix is 640×480 dots, however, only the vicinity of a n-th row and a m-th column is shown, to avoid complexity. A complete matrix can be obtained by developing the same pattern vertically and horizontally. An example of operation using this circuit, is shown in FIG. 2.

Signal lines $X_1, X_2 \ldots X_n, X_{n+1} \ldots X_{480}$ (hereinafter collectively referred to as X-line) are connected with gate electrodes of TFTs. Rectangular pulse signals are applied thereto in turn, as shown in FIG. 2. On the other hand, signal lines $Y_1, Y_2 \ldots Y_m, Y_{m+1} \ldots Y_{640}$ (hereinafter collectively referred to as Y-line) are connected with the source or drain electrodes of TFTs, to which a signal comprising a plurality of pulses is applied. In this pulse train, 480 pieces of information are included in one unit of time $T_1$.

In the following example, four picture elements $Z_{n,m}$, $Z_{n+1,m}$, $Z_{n,m+1}$, $Z_{n+1,m+1}$ are paid attention to, and, since the voltage of the picture element will not be changed unless signals are applied both to a gate electrode and to a source electrode, signal lines $X_n, X_{n+1}, Y_m$, and $Y_{m+1}$ are to be paid attention to, in relation to these four picture elements.

It is presumed that a rectangular pulse is applied to $X_n$, as shown in the figure. While the four picture elements $Z_{n,m}$, $Z_{n+1,m}$, $Z_{n,m+1}$, and $Z_{n+1,m+1}$ are now paid attention to, corresponding states of $Y_m$ as well as of $Y_{m+1}$ are to be paid attention to. Since there is a signal at $Y_m$ and there is no signal at $Y_{m+1}$, a picture element $Z_{n,m}$ will be in voltage state (high voltage level), and $Z_{n,m+1}$ will be in non-voltage state (low voltage level, e.g. zero level). By cutting the pulse of X-line, earlier than a voltage applied to Y-line, the voltage state of the picture element is maintained by the capacitor thereof, and thus the voltage state of the picture element $Z_{n,m}$ will be maintained. In principle, the state of each picture element will be maintained until a next signal is applied to $X_n$.

An additional pulse is applied to $X_{n+1}$. Since $Y_m$ is in non-voltage state and $Y_{m+1}$ in voltage state at the time, as shown in the figure, the picture element $Z_{n+1,m}$ will be in non-voltage state, while another picture element $Z_{n+1,m+1}$ will be in voltage state, and the state of each picture element is maintained as mentioned above.

When a second pulse is applied to a signal line $X_n$ after a time $T_1$ has passed since a preceding pulse was applied thereto, the state of the picture element $Z_{n,m}$ is changed into non-voltage state, and that of the picture element $Z_{n,m+1}$ is changed into voltage state, for $Y_m$ is in non-voltage state and $Y_{m+1}$ in voltage state. An additional pulse is applied to $X_{n+1}$. Since both $Y_m$ and $Y_{m+1}$ are in voltage state at the time, as shown in the figure, both of the picture elements $Z_{n+1,m}$ and $Z_{n+1,m+1}$ will be in voltage state. The voltage state of the picture element $Z_{n+1,m+1}$ will be continued thereby.

A third signal is applied to $X_n$ after a time $2T_1$ has passed. This time, since both $Y_m$ and $Y_{m+1}$ are in voltage state, the picture element $Z_{n,m}$ will be changed from non-voltage state into voltage state, and the voltage state of the picture element $Z_{n,m+1}$ will be continued. An additional pulse is applied to $X_{n+1}$. Since both $Y_m$ and $Y_{m+1}$ are in non-voltage state at the time, both of the picture elements $Z_{n+1,m}$ and $Z_{n+1,m+1}$ will be in non-voltage state, and the voltage state for each is thus completed.

A fourth signal is then applied to $X_n$ after a time $4T_1$ has passed. Since both $Y_m$ and $Y_{m+1}$ are in non-voltage state at the time, both of the picture elements $Z_{n,m}$ and $Z_{n,m+1}$ will be changed from voltage state into non-voltage state. An additional pulse is applied to $X_{n+1}$, and, since both $Y_m$ and $Y_{m+1}$ are in non-voltage state, both of the picture elements $Z_{n+1,m}$, and $Z_{n+1,m+1}$ continue to be in non-voltage state.

In this manner, one cycle is completed. In this period of time, three pulses are applied to each X-line, while 3×480= 1440 information signals are applied to each Y-line. The period of time of the one cycle is $7T_1$, and as a $T_1$, for example, 10 nsec–10 msec is appropriate. When each picture element is paid attention to, a pulse of the time $T_1$ as well as a pulse of the time $4T_1$ are applied to the picture element $Z_{n,m}$, and consequently, the same effect as when a pulse of $5T_1$ is applied, is obtained visually. Namely, a brightness of the grade "5" is obtained. In the same manner, the brightnesses of "2", "6", and "3" are obtained for the picture elements $Z_{n,m+1}$, $Z_{n+1,m}$, and $Z_{n+1,m+1}$, respectively.

While an 8 gradations display is achieved in the above example, advanced gradation can be achieved by adding more pulse signals. Advanced gradation display of as many as 256 gradations will be achieved by applying additional five pulses, for example, to each X-line and applying 8×480 =3840 information signals to each Y-line during one cycle.

Figure 3:
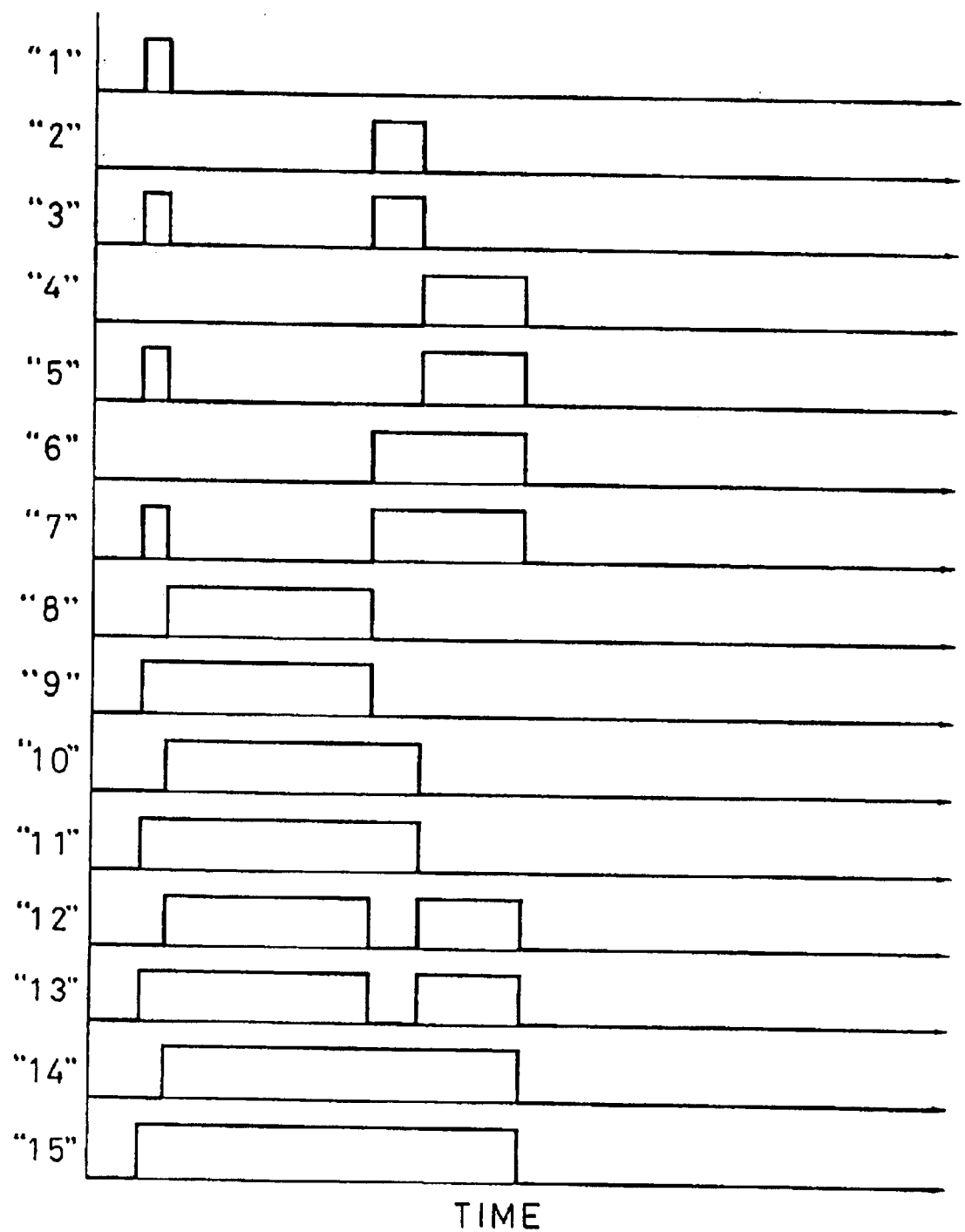
FIG. 3 shows an example of a drive waveform in accordance with the present invention.
Figure 4:
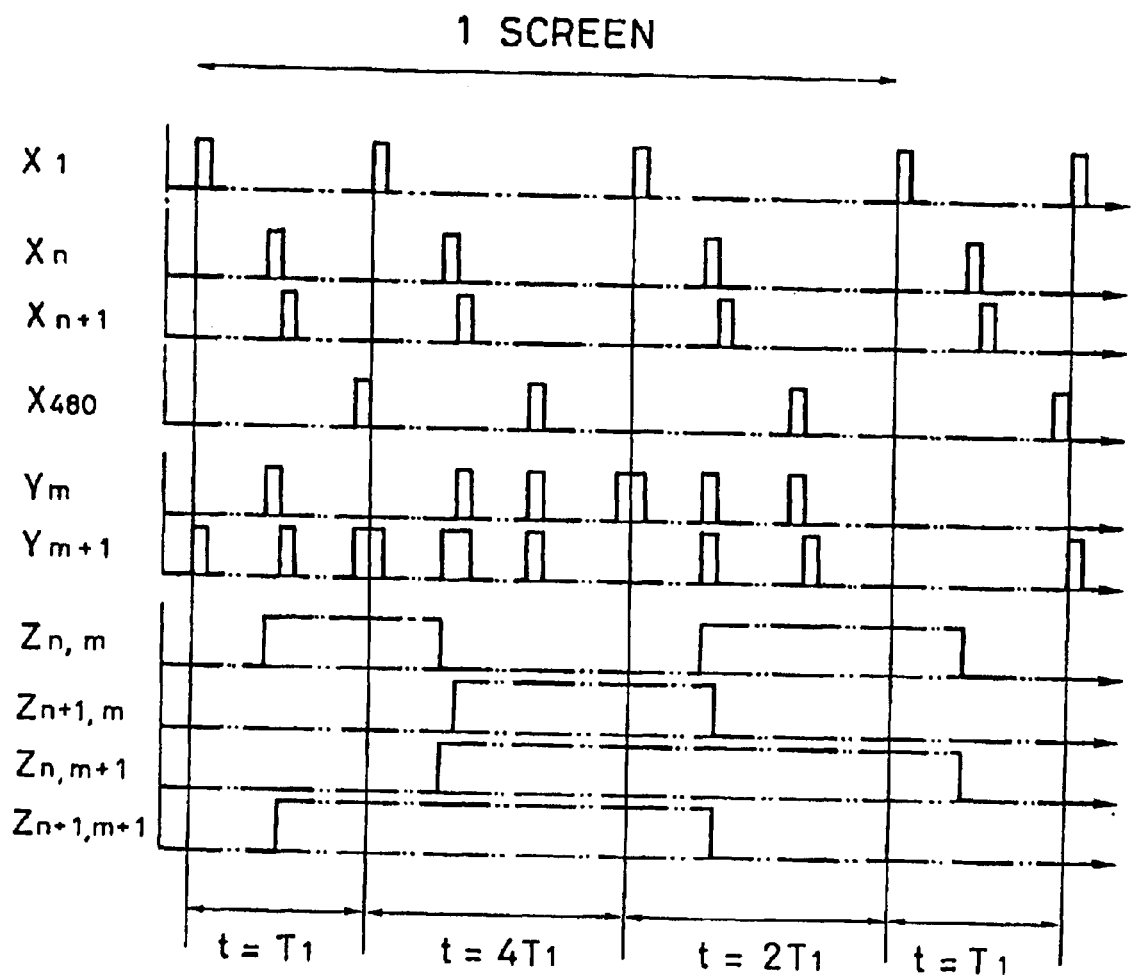
FIG. 4 shows an example of a drive waveform in accordance with the present invention.

An example of the arrangement is shown in FIGS. 1 and 2, where the duration of the voltage applied to a picture element is increased in a geometrical progression in such a way that it is first $T_1$, then $2T_1$, and then $4T_1$, whereas this arrangement may be altered in such a way that it is first $T_1$, then $8T_1$, and then $2T_1$, and finally $4T_1$, as shown in FIG. 3. The arrangement of the duration of the voltage shown in FIG. 3 can be obtained by applying pulses (rectangular pulses to a signal line (X-line) at intervals, wherein said intervals are $T_1$ between the i-th pulse and the (i+1)-th pulse, $2^N T_1$ between the (i+1)-th pulse and the (i+2)-th pulse, $2T_1$ between the (i+2)-th pulse and the (i+3)-th pulse, and $2^{N-1} T_1$ between the (i+3)-th pulse and the (i+4)-th pulse where i is a natural number and $T_1$ is a constant period and n is 3 in this case. An example of a signal for driving in a way as illustrated in FIG. 3, is shown in FIG. 4. The number of pulses to be applied to X-line per one screen is three, which is the same as for the case shown in FIG. 2, while the time between pulses is first $T_1$, then $4T_1$, and finally $2T_1$. In this manner, the brightnesses of "3", "4", "6", and "5", are obtained, for example, for the picture elements $Z_{n,m}, Z_{n,m+1}$, $Z_{n+1,m}$, and for $Z_{n+1,m+1}$ respectively. By adopting a display method of coupling long and short pulses with each other as shown in FIG. 3 or in FIG. 4, the operation of data transmission is facilitated. The structure of a peripheral circuit including the data transmission will be set forth in the following description.

Figure 14:
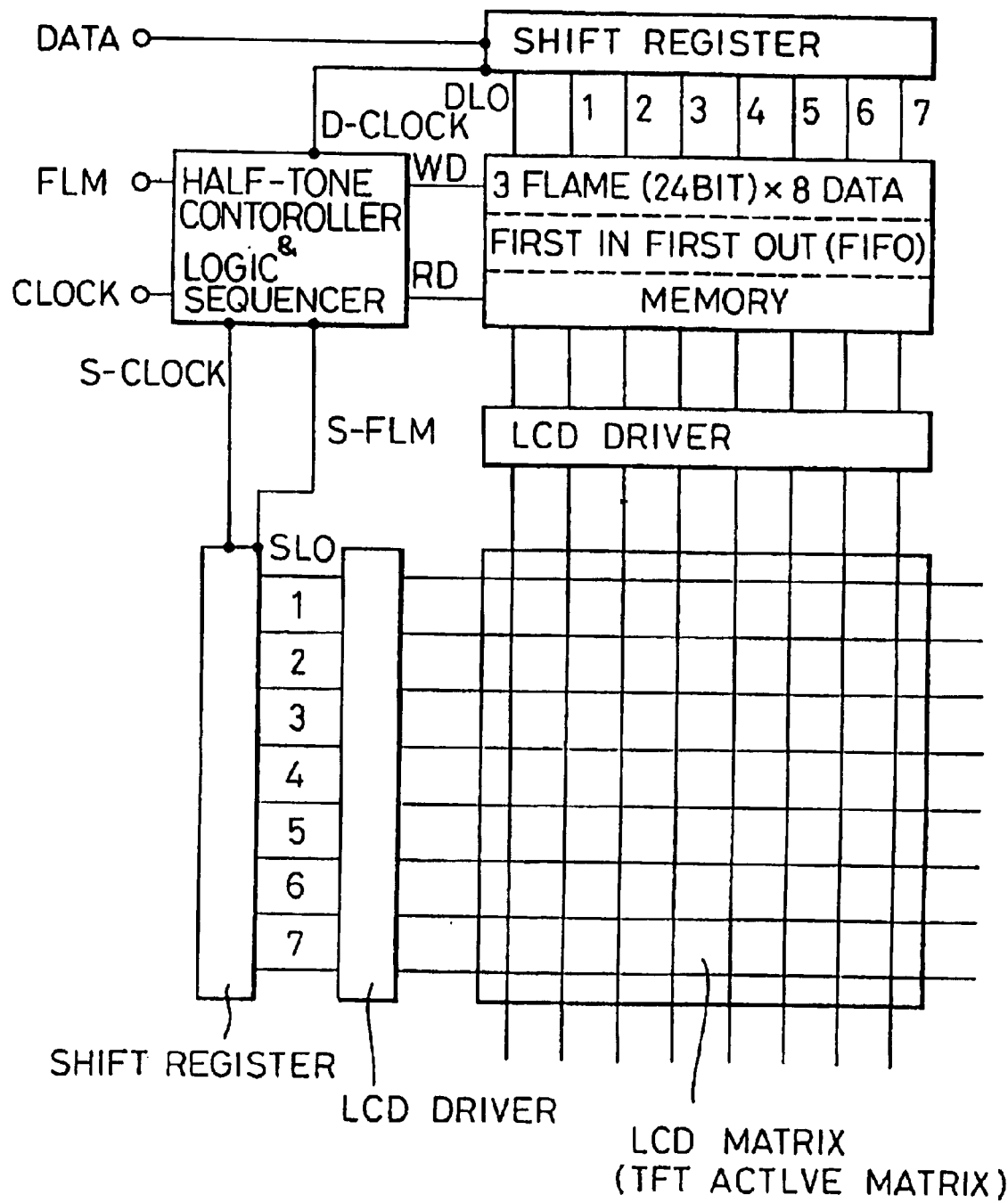
FIG. 14 shows a block figure of an electro-optical device in accordance with the present invention.

A display device main body for implementing the present invention, and the condition of a peripheral circuit thereof, are illustrated in FIG. 14. A matrix size of a screen is as small as 8×8, for the purpose of simplification. The present invention is characterized by adding a First In First Out memory device (hereinafter referred to as FIFO) on the external part of the driver of Y-line. Namely, the data to be supplied to Y-line is temporarily stored by FIFO, and is then outputted to Y-line, i.e. a display device. The data to be applied to Y-line has been an analog signal according to a prior art, whereas a digital signal is used in accordance with the present invention. In a sense, it can be said that FIFO can be added because the signal can be digitized. By adding FIFO, the flowing of the signals can be averaged, and thus the burden on a driving circuit before a shift register as shown in FIG. 14, can be alleviated.

The terminology the burden on the driving circuit can be explained in the following manner. When a signal of Y-line shown in FIG. 4 is paid attention to, as many as 480 information signals are applied to Y-line during first $T_1$. Although other 480 signals are applied during the following $4T_1$, the density of the signal is one-fourth of the first because the duration is four times as long as that of the first. The density of a signal during the following $2T_1$ is a half of the first. When there is unevenness in the density of the signals, a circuit should be designed based on the case of highest density. It is thus required that 480 signals are processed by a shift register during $T_1$.

When the data during $T_1$ as well as the data during the next $4T_1$ are transmitted at the same time, since there are 960 signals in the time period of $5T_1$, 192 data are to be transmitted during one $T_1$. By providing FIFO, and whereby temporarily storing the data, the burden on the shift register can be alleviated. This can be compared to a dam, into which a constant flow rate of water is flowed, and in which a constant amount of water is accumulated therein, and thus the dam can flexibly discharge a large amount of water at a time or gradually discharge a small amount. N-th image signal is outputted on an active matrix electro-optical device with (N+1)-th and (N+2)-th image signals stored in a first in first out memory device connected to said active matrix electro-optical device during duration of said N-th image signal on said active matrix electro-optical device.

Referring to FIG. 14, fine timings of the FIFO and the shift registers for X-lines and Y-lines are controlled by a logic sequencer.

Figure 15:
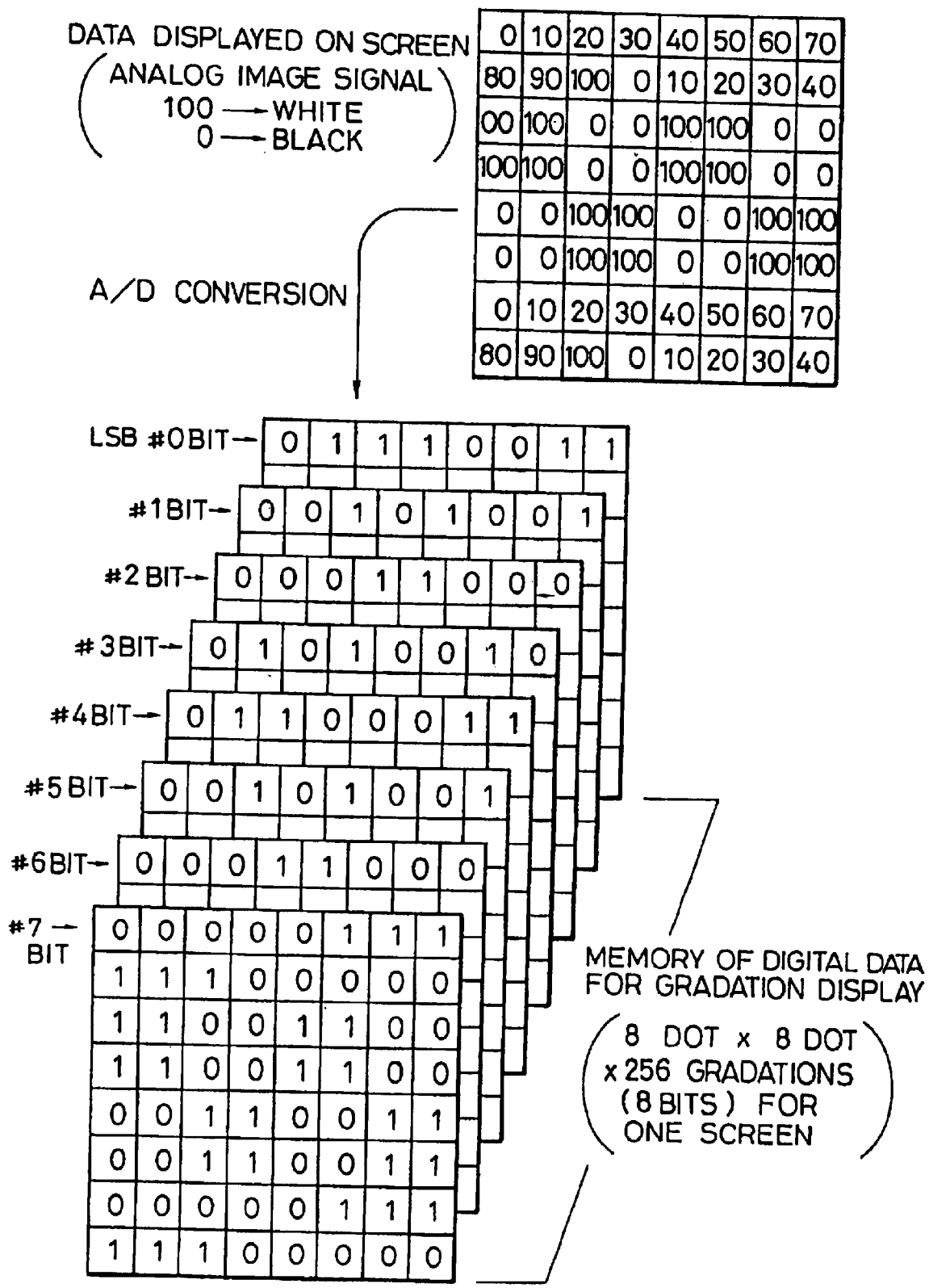
FIG. 15 shows a method of converting analog image data into digital image data in accordance with the present invention.

An example of how a projected signal is processed is described infra. A signal input as a normal analog image signal is immediately digitized by binary notation calculation process, as shown in FIG. 15. The signal is converted into, for example, a digital signal of 8-bit, or an eight-digit number. In this example, numeral 10 of analog signal, for example, is converted into 00011001, and numeral 20 into 00110011, or numeral 100 into 11111111. By converting into an 8-bit signal, the display of $2^8$=256 gradations is achieved. In the same manner, when 64 gradations or 16 gradations are required, the analog signal is converted into 6-bit, or 4-bit signals, respectively. When a 128-gradation is required, it is converted into a 7-bit signal, or a seven-digit number.

The signal thus converted is temporarily stored in a memory. Each data is not stored as a group of data of 8-bit, but is distributed to and is stored in a memory of digital data for gradation display, as a data distributed to total eight places of each digit of 8-bit, i.e. $2^0, 2^1, 2^2, 2^3, 2^4, 2^5, 2^6$, and $2^7$, namely as a two-dimensional data of #0, #1, #2, #3, #4, #5, #6, and #7. The digital binary signal of each of the 8 digits is stored into corresponding one of memory areas. When the data of a first line and a second column of a matrix is required, a first row (line) and a second column of each data of #0–#7 bits is to be read. In this case, the data of 0, 0, 0, 1, 1, 0, 0, 1, is stored in this order from #7. A gradation data is thus 00011001, and when this is converted into analog mode in decimal system, numeral 10 is obtained.

Figure 16:
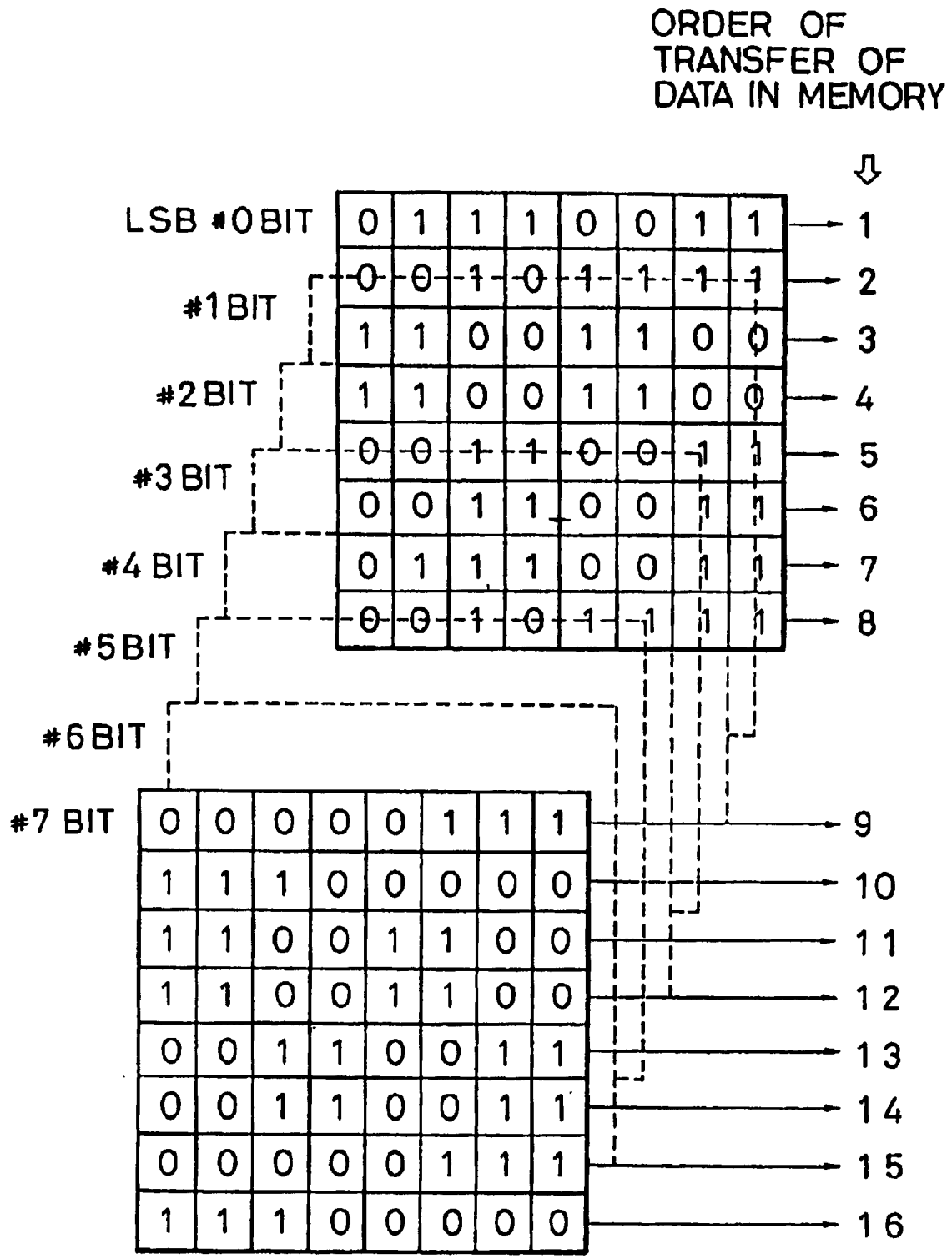
FIG. 16 shows an example of the order of data transfer in accordance with the present invention.

The data thus stored is transferred in turn from a first line of #0 bit to a device of next step (e.g. a shift driver operatively connected with the active matrix electro-optical device), as shown in FIG. 16. When the transfer is carried out up to an eighth row (line), it is re-started from a first row (line) of #7 bit in turn.

Figure 17:
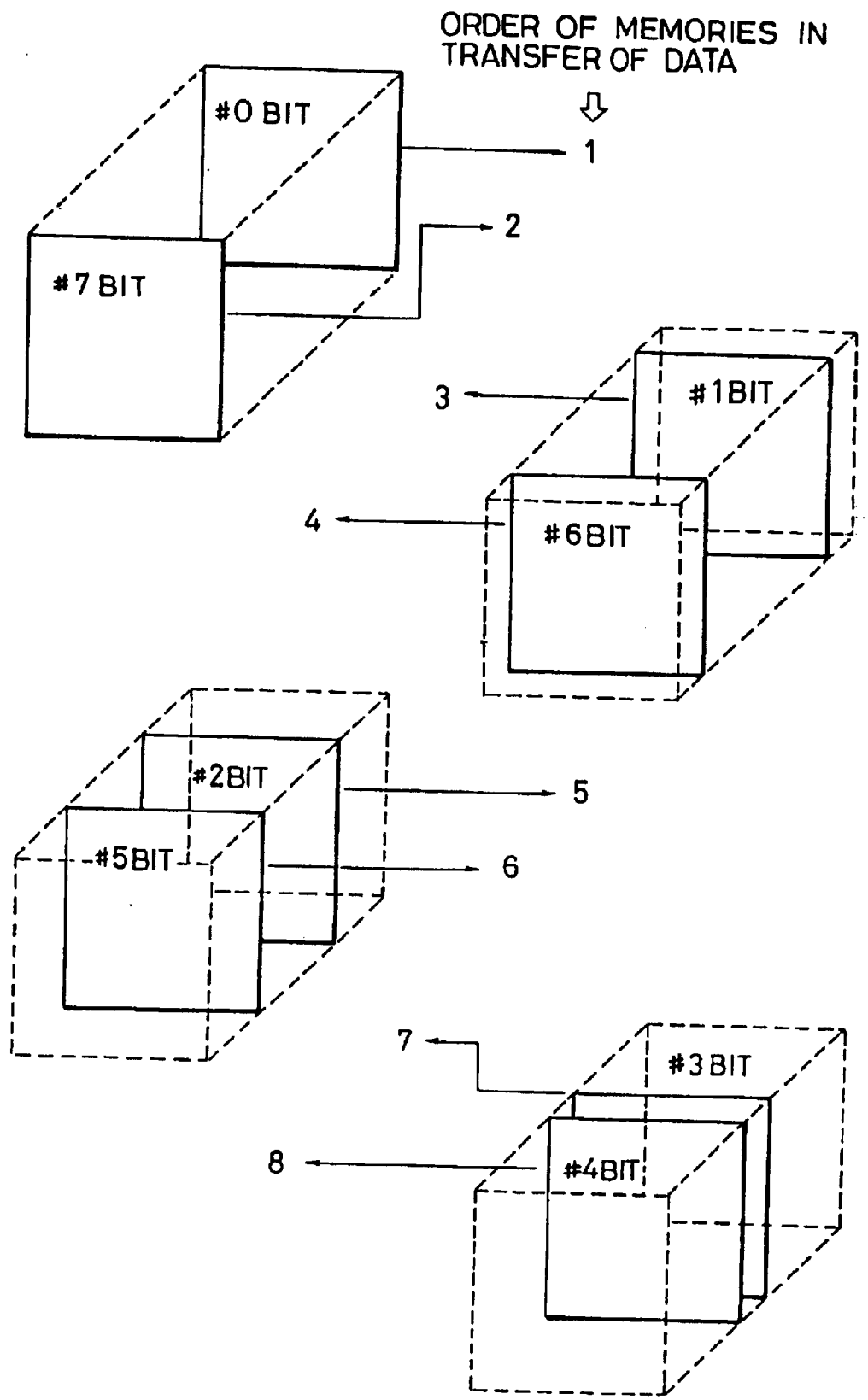
FIG. 17 shows an example of the order of data transfer in accordance with the present invention.

When the transfer of #7 bit is completed, the data is transferred in such a manner as (#1, #6), (#2, #5), (#3, #4), as shown in FIG. 17. The order of the transfer may be reverse thereof, or may be in the order of (#0, #7), (#6, #1), (#2, #5), (#4, #3). In any way, the density of image output is the highest when the combination of the data of #3 and #4 is outputted, as shown infra, and there will be no particular problem if the other data combinations are designed to be of the density lower than this combination.

In case of 128 gradations, since the signal is 7-bit from #0 to #6, two-digit signals cannot be coupled with each other. In this case, a digit which does not include an image signal is separately provided as a dummy, which may be handled as #7, so as to carry out a process in apparently the same way as for 8-bit. The data #6 can be processed individually, with the rest properly coupled, in such a way as #6, (#0, #5), (#1, #4), (#2, #3).

When a data is transferred in a single mode in such a way as #0, #1, #2, . . ., in the manner shown in FIG. 2 without making combinations as shown in the abovementioned examples, the technical idea of coupling the data of higher output density and of lower output density together so as to average the densities, and to maintain a low density, cannot be realized. There will be no problem, however, if the process velocity of a later step is high enough compared with the transfer velocity of the data.

Figure 18:
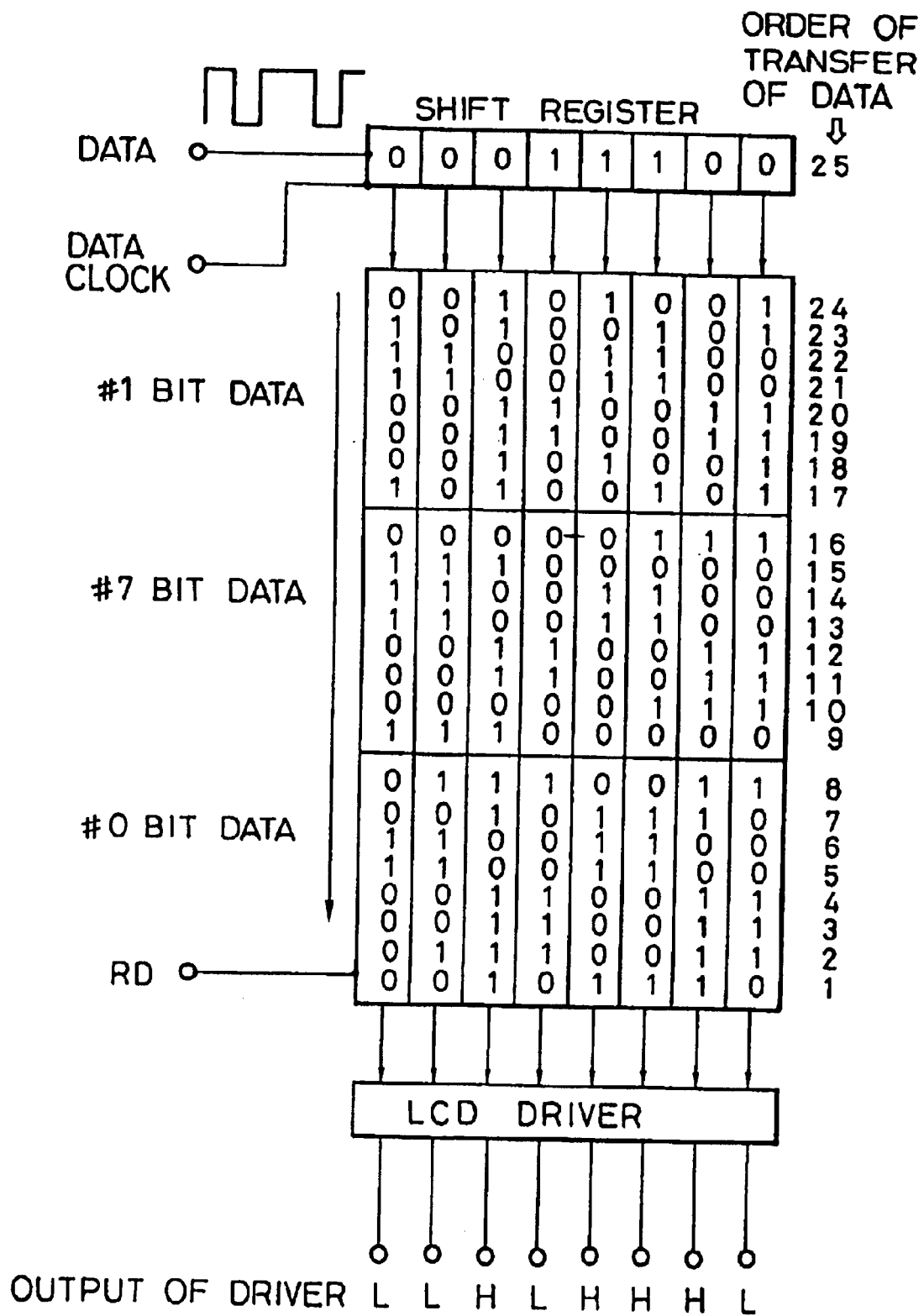
FIG. 18 shows an example of the order of data transfer in accordance with the present invention.

The data thus transferred is distributed to each line of Y-line by a shift resister, and is inputted to FIFO, where the data precedently inputted is transmitted ahead in turn, and is sent to a LCD driver in just the same way when a gelidium jelly is pushed out one after another, and is thus outputted to each Y-line. This is illustrated in FIG. 18. The velocity is not constant. Referring to FIG. 18, after the data of #0 bit is pushed out, the data of #7 bit is pushed out, and after a while, the data of #1 bit is pushed out. This is illustrated in FIG. 19.

Figure 19:
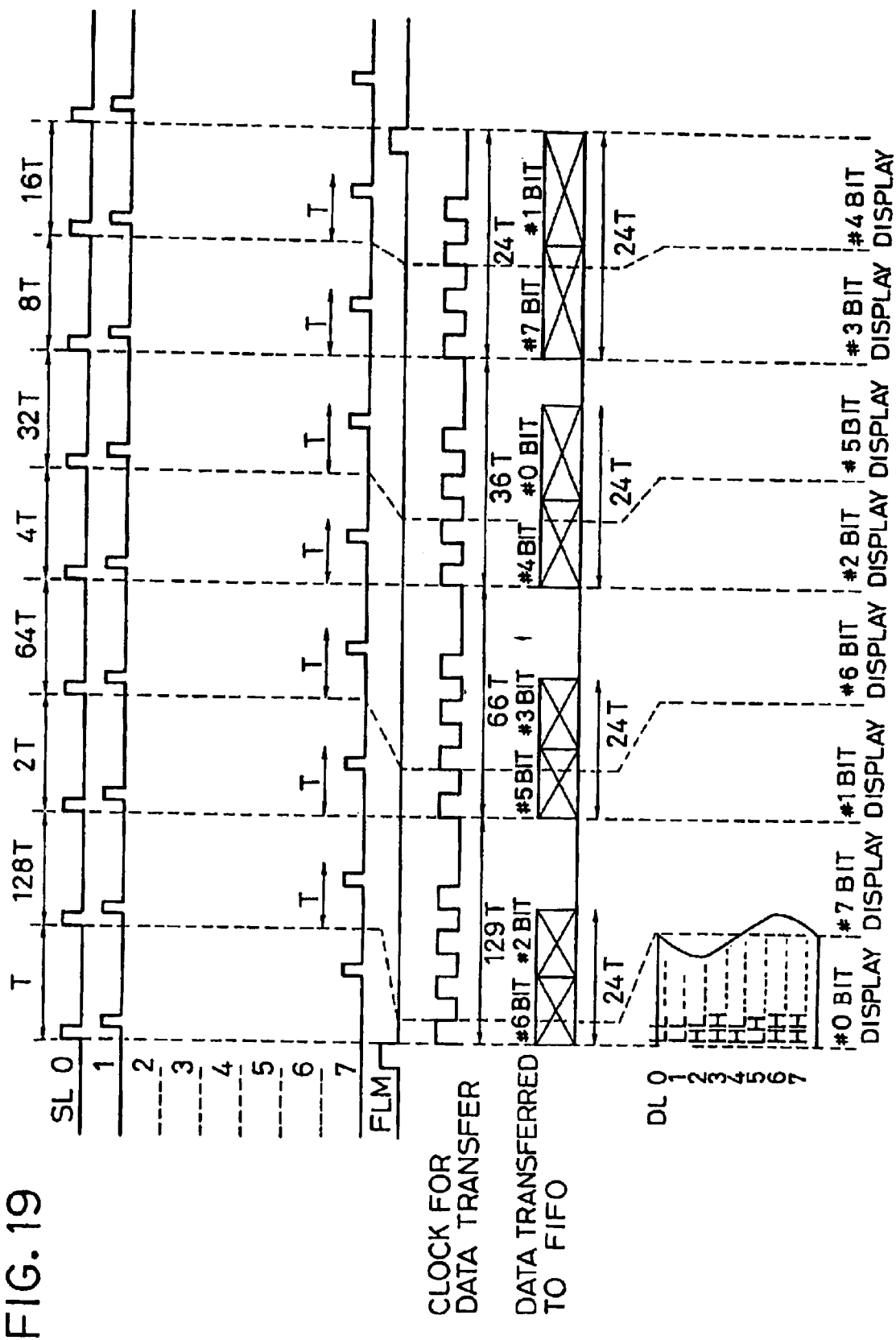
FIG. 19 shows an example of a driving signal in accordance with the present invention.

Signals of X-line designated by SL 0–7, signals of Y-line designated by DL 0–7, and the data transfer to Y-line, are illustrated in FIG. 19. When the data of #0 is first outputted to Y-line, the data of #7 as well as of #1 are stored in FIFO. The output of #0 is completed during a time T, and then the data #7 is outputted, which will be completed during the time T. The data of #7 is retained on a screen matrix during the time 127T. The data of #6, and subsequently the data of #2 are inputted to FIFO via a shift register, while the data #0 and #7 are outputted. The time necessary for this process is 12T for each, thus a total 24T. When the data of #1 is outputted, only one-twelfth of the data of #6 is inputted to FIFO, and, even when the data of #7 is outputted, only one-sixth of the data input of #6 has been completed. In order to carry out the inputting of these data, the time during which the data of #7 is displayed on a screen and a LCD driver is not actuated, is primarily used. For this reason, the circuit of the former step of FIFO, e.g. a shift register or a memory of digital data for gradation display, can be operated at a speed lower than that of the LCD driver, and the burden on the circuit is thus alleviated.

The data of #1 is then outputted, and after the data output is completed, the data of #6 is outputted after an interval of a time T. Since a vacancy is generated in FIFO by the data of #1 being outputted, the following data of #5 as well as of #3 are inputted thereto. The time necessary for the input is 24T, the same as required for the input of the data of #6 as well as of #2.

The data of #3 as well as of #4 are inputted to FIFO, and is outputted from an LCD driver in this manner, and one cycle is completed thereby, forming one screen of 256-gradation display. As mentioned supra, the time required for data input to FIFO was 12T per 1-bit, which will be determined in consideration of the time for outputting the data of #3 as well as of #4. Namely, after the data of #3 stored in FIFO is outputted during the time T, as shown in the figure, it is retained during the time 7T, and subsequently the data of #4 is retained during the time 15T after the data of #4 is outputted during the time T. These take place during the time 24T, which is shorter than the time for retaining data of any other combinations. Since the data of #7 as well as of #1 are to be inputted to FIFO during this time, the maximum velocity for the data transfer to FIFO is defined as 12T per 1-bit. The data transfer can be carried out within the time shorter than this.

The explanation supra was related to the FIFO of 24×8 bits, and the size of the FIFO is determined in consideration of the size of a matrix of a display device: if the size of the matrix is N×M, the size of the FIFO will be of 3×N×M.

As should be clear from the explanation supra, since fine time allocation is required in order to carry out high gradation display, a very high-speed switching is essential for the circuit of such as active device (TFT) shift register, LCD driver, and of FIFO. In order to achieve 256 gradations, for example, 30 or more of moving pictures should be fed per second, thus $256T_1 < 300$ msec, so that $T_1 < 100$ microsec is to be achieved. If X-line which is connected with a gate electrode consists of 480 lines, for example, 480 signals must be outputted to each Y-line in 100 microsec and each X-line has to follow the velocity to drive TFT: consequently, it is required that a pulse of no longer than 200 nsec is applied, and that TFT can respond to such pulse. Although only the TFT of NMOS was used in the example shown in FIG. 5, the circuit having a CMOS circuit may be connected to a picture element for the purpose of increasing an operational velocity. Namely, CMOS inverter circuit, CMOS modified inverter circuit, CMOS modified buffer circuit, or CMOS modified transfer gate circuit and the like may be used.

Although there was no description concerning the alternating technique for preventing the deterioration of a liquid crystal due to electrolysis etc. under application of dc current to the liquid crystal for a long time, by reversing the direction of the voltage applied to the liquid crystal in a cycle for every screen, or for every few screens, since this technique does not contradict the present invention, it should be clear that the alternating technique may be carried out in accordance with the present invention.

Although the non-voltage state and the voltage state of a signal were clearly discriminated in the explanation supra, for the purpose of simplification, the only question is whether the level of the signal is not more or not less than the thresholds of liquid crystal and of TFT, and the level is not necessarily zero. It should be also clear that the width, height, or polarity of a pulse should be determined according to the operational condition of a device.

It is also possible to change a practical voltage applied to a picture element material by applying a proper bias voltage to the counter electrode of the picture element. For example, by applying a proper voltage to the counter electrode of the picture element, the direction of the voltage applied to the picture element material can be of positive or negative as required. This operation is essential when a ferroelectric liquid crystal is used.

Although a screen was scanned line by line according to the explanation supra, the skip scanning method, by which scanning is carried out for every other line or for every few lines, can be adopted.

Examples of preferred embodiments for manufacturing TFT necessary for implementing the present invention, as well as for manufacturing a NTSC type television, are described infra.

Preferred Embodiment 1

In this embodiment, a wall mounted television set was manufactured by using the liquid crystal device utilizing the circuit structure as shown in FIG. 5, which will be described infra. Polycrystalline silicon that received laser annealing was used for TFT at the time of manufacturing.

Figure 7A:
FIGS. 7(A)–(F) show a process of TFT in accordance with the preferred embodiment.
Figure 7B:
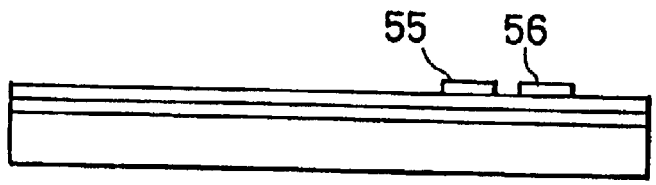

The actual arrangement or structure of electrodes etc. corresponding to this circuit structure is shown in FIG. 6, for one picture element. The manufacturing method of the liquid crystal panel used in the first preferred embodiment will be first explained with reference to FIGS. 7 and 8. FIGS. 7 and 8 are cross sectional views and plan views of the liquid crystal panel, respectively. Referring to FIG. 7(A), a silicon oxide film was manufactured at a thickness of 1000–3000 angstroms as a blocking layer 51 by magnetron RF(high frequency) sputtering, on a glass substrate 50, which is not expensive such as quartz, and which can bear the thermal treatment of no more than 700° C., for example, approximately 600° C., under the process conditions as follows: in a 100% oxygen atmosphere; the temperature of film formation was 15° C.; output was 400–800 W; and pressure wis 0.5 Pa. The rate of film formation was 30–100 angstroms/minute when quartz or single crystalline silicon was used as a target.

A silicon film 52 was manufactured thereon by plasma CVD. The temperature for film formation was 250–350° C., or 320° C. in this preferred embodiment, and mono-silane (SiH$_4$) was used. Besides mono-silane (SiH$_4$), disilane (Si$_2$H$_6$) or trisilane (Si$_3$H$_8$) may be used. These were introduced into a PCVD device at a pressure of 3 Pa, and the film was formed by applying high frequency power of 13.55 MHz. At the time, high frequency power should be 0.02–0.10 W/cm$^2$, or 0.055 W/cm$^2$ in this preferred embodiment. The flow rate of mono-silane (SiH$_4$) was 20 SCCM, and the rate of film formation was approximately 120 angstroms/minute at the time. The silicon film may be an intrinsic semiconductor or boron may be added to the film at a concentration of $1 \times 10^{15} - 1 \times 10^{18}$ cm$^{-3}$ by means of diborane during the film formation. Sputtering or low pressure CVD may be employed instead of the plasma CVD for the formation of the silicon layer which will be a channel region of TFT, which will be described below in a simplified manner.

In case of sputtering, a single crystalline silicon was used as a target, and the sputtering was carried out in the atmosphere of 20–80% of hydrogen mixed with argon, with the back pressure before sputtering defined no more than $1 \times 10^{-5}$ Pa: e.g. 20% of argon and 80% of hydrogen; the temperature for film formation was 150° C.; frequency was 13.56 MHz; sputtering output was 400–800 W; and, pressure was 0.5 Pa.

In case of employing low pressure CVD, disilane(Si$_2$H$_6$) or trisilane(Si$_3$H$_8$) was supplied to a CVD device, at a temperature of 450–550° C., 100–200° C. lower than the temperature of crystallization, e.g. at 530° C. The pressure in a reactor was 30–300 Pa, while the rate of film formation was 50–250 angstroms/minute.

Oxygen concentration in the film formed in this way is preferably not more than $5 \times 10^{21}$ cm$^{-3}$. The oxygen concentration should be no more than $7 \times 10^{19}$ cm$^{-3}$, or preferably no more than $1 \times 10^{19}$ cm$^{-3}$, in order to promote crystallization, however, if the concentration is too low, leakage current in an OFF condition is increased due to the illumination of a back light, whereas, if the concentration is too high, crystallization will not be facilitated, and the temperature or time for laser annealing must be higher or longer thereby. The concentration of hydrogen was $4 \times 10^{20}$ cm$^{-3}$, which was one atom % for the silicon at a concentration $4 \times 10^{22}$ cm$^{-3}$.

Oxygen concentration should be not more than $7 \times 10^{19}$ cm$^{-3}$ or preferably not more than $1 \times 10^{19}$ cm$^{-3}$, so as to promote crystallization for source or drain, while oxygen may be ion-implanted only into the region that forms a channel of TFT constituting a pixel, at a concentration of $5 \times 10^{20} - 5 \times 10^{21}$ cm$^{-3}$.

The silicon film in an amorphous state was formed at a thickness of 500–5000 angstroms, or 1000 angstroms in this preferred embodiment, in the manner described above.

Patterning was carried out for a photoresist 53 using a first mask ① so as to open only the region for source or drain. A silicon film 54 was manufactured thereon as an n-type activation layer, by plasma CVD, at the temperature of film formation 250° C.–350° C., e.g. 320° C. in the preferred embodiment 1, and mono-silane(SiH$_4$) and phosphine (PH$_3$) of mono-silane base at a concentration of 3% were used. These were introduced into the PCVD device at a pressure of 5 Pa, and the film was formed by applying high frequency power of 13.56 MHz. The high frequency power should be 0.05–0.20 W/cm$^2$, e.g. 0.120 W/cm$^2$ in the preferred embodiment 1.

The specific electric conductivity of the n-type silicon layer thus formed was approximately $2 \times 10^{-1}$ [$\Omega.$cm$^{-1}$], while film thickness was 50 angstroms. Thus, the structure shown in FIG. 7(A) was obtained. The resist 53 was then removed using a lift-off method, and source and drain regions 55 and 56 were formed. Thus, the structure shown in FIG. 7(B) was obtained.

Figure 7C:
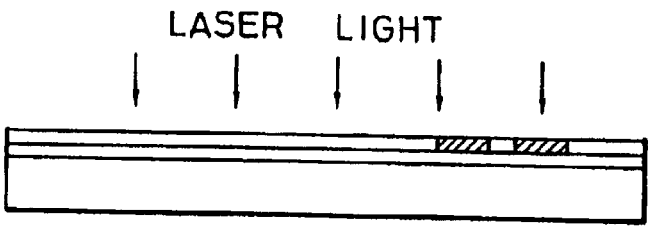

The source, drain and channel regions were laser-annealed by XeCl excimer laser, and the activation layer was laser-doped at the same time as shown in FIG. 7(C). The threshold energy of the laser energy employed at the time was 130 mJ/cm$^2$, and 220 mJ/cm$^2$ is necessary as the laser energy in order to melt the film throughout thickness of the film. If the energy of no less than 220 mJ/cm$^2$ is irradiated from the start, however, hydrogen included in the film will be abruptly ejected, and the film will be damaged thereby. Thus the melting must be carried out only after hydrogen is first ejected at a low energy. In the first preferred embodiment, crystallization was carried out at an energy of 230 mJ/cm$^2$, after hydrogen was first purged out at 150 mJ/cm$^2$.

Then, the silicon film 52 was etched off by a second mask ② to form an island region 63 for an N-channel thin film transistor.

A silicon oxide film was formed as a gate insulating film thereon at a thickness 500–2000 angstroms, e.g. 1000 angstroms, under the same condition as for the silicon oxide film manufactured as a blocking layer. A small amount of fluorine may be added thereto at the time or film formation, so as to stabilize sodium ion.

Further, a silicon film doped with phosphorus at a concentration $1-5 \times 10^{21}$ cm$^{-3}$, or a multi-layered film comprising this silicon film and molybdenum (Mo), tungsten (W), MoSi$_2$ or WSi$_2$ film formed thereupon, was formed on the above-mentioned silicon oxide film, which was then subjected to a patterning process using a third photomask ③.

Figure 7D:
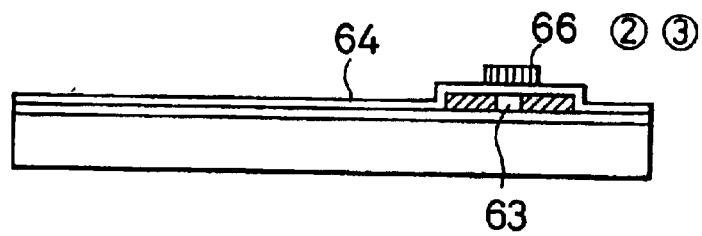

A gate electrode 66 for NTFT was then obtained, as shown in FIG. 7(D): as a gate electrode a phosphorus-doped silicon layer was formed at a thickness of 0.2 micrometer and a molybdenum layer was formed thereupon at a thickness of 0.3 micrometer, for example. The channel length was e.g. 7 $\mu$m.

Figure 8A:
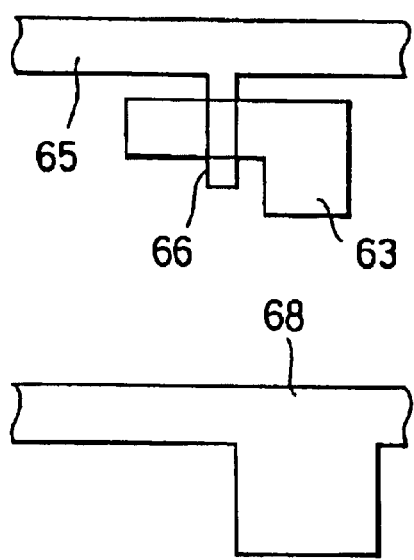
FIGS. 8(A)–(D) show a process of TFT in accordance with the preferred embodiment.

At the same time, a gate wiring 65 and a wiring 68 in parallel therewith were obtained by the patterning as shown in FIG. 8(A).

As a gate electrode material, other material than described above, e.g. aluminum (Al), can be used.

In case of using aluminum (Al) as a gate electrode material, since a self-aligning process is available by anodic-oxidizing the surface of aluminum that is first patterned by a third photomask ③ the contact holes of source and drain can be formed closer to the gate, and TFT characteristic can be improved due to the increase in mobility as well as the reduction in threshold voltage.

In this way, C/TFT can be manufactured without elevating the temperature not less than 400° C., in every process. Therefore, there is no need to use an expensive material such as quartz as a substrate, and it can be said that this is a most suitable process for manufacturing the wide-screen liquid crystal display device in accordance with the present invention.

Figure 7E:
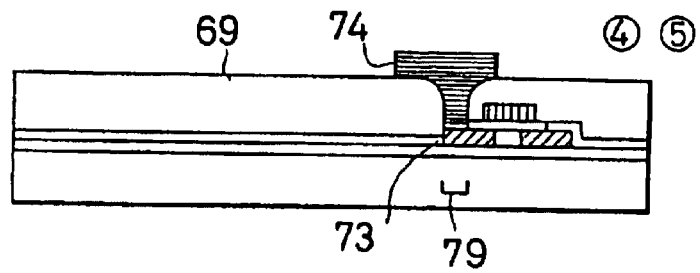
Figure 7F:
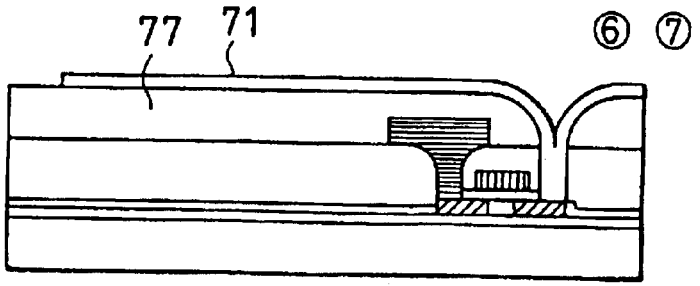
Figure 8B:
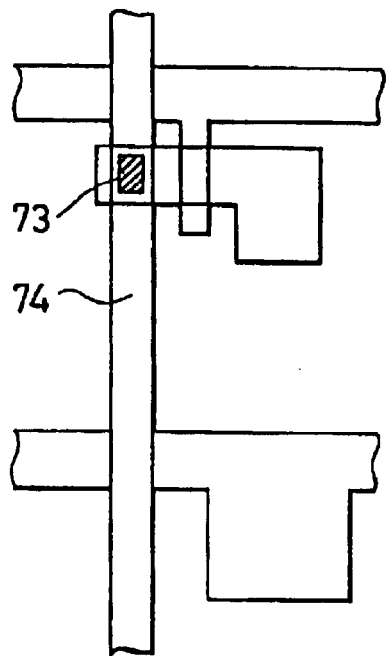
Figure 8C:
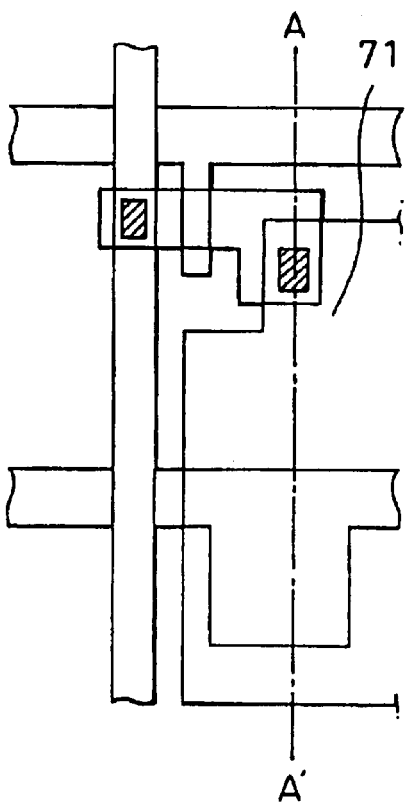

An inter-layer insulating film 69 made of silicon oxide was formed by sputtering, in the manner described supra. The silicon oxide film can be formed by LPCVD, photo-CVD, or by atmospheric pressure CVD. The film was formed at a thickness of 0.2–0.6 micrometer, for example, and an opening 79 for electrode was formed using a fourth photomask ④. Aluminum was then sputtered over all of these at a thickness of 0.3 micrometer, and a lead 74 as well as a contact 73 were formed using a fifth photomask ⑤ as shown in FIG. 7(E) and FIG. 8(B) (plan view), and thereafter an organic resin 77 for flattening or a transparent polyimide resin, for example, was applied to the surface thereof, and an opening of an electrode was formed again by a sixth photomask ⑥. An ITO (indium tin oxide) was sputtered over all of these, at a thickness of 0.1 micrometer, and a picture element electrode (pixel electrode) 71 was formed using a seventh photomask ⑦. The ITO was formed at a temperature ranging from room temperature to 150° C., and was then subjected to annealing process in oxygen or atmosphere at a temperature of 200–400° C. Thus, the structure shown in FIG. 7(F) and FIG. 8(C) (plan view) was obtained. In FIGS. 7(F) and 8(C), the thin film transistor is connected with the pixel electrode 71 so that a surface of the pixel electrode is rounded along the rounded edge of the organic resin film.

Figure 8D:
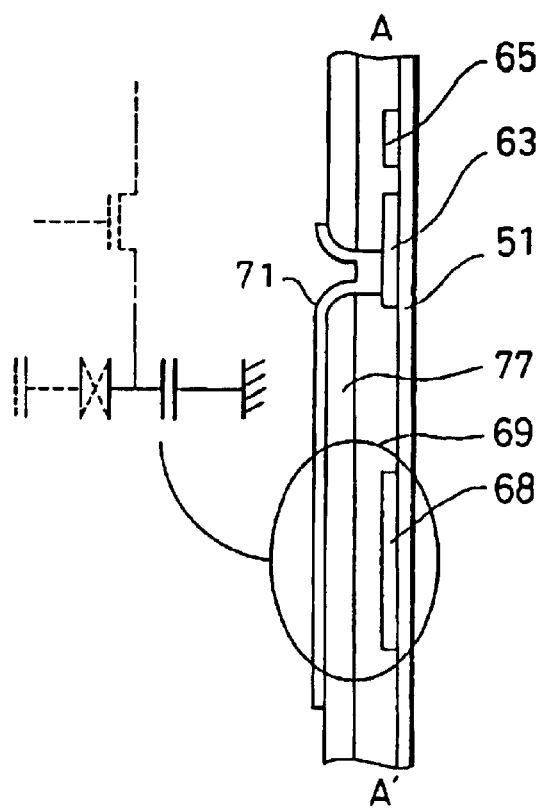

The cross section A–A' of FIG. 8(C) is shown in FIG. 8(D). In practice, a counter electrode is provided in such a way that a liquid crystal material is sandwiched between the counter electrode and the structure shown in FIG. 8(D), while a capacity is generated between the counter electrode and a picture element electrode 71, as shown in the figure. A capacity is also generated between the wiring 68 and the electrode 71 at the same time. By maintaining the wiring 68 in the same electric potential as the counter electrode, a circuit in which a capacity is inserted in parallel with a liquid crystal picture element, is to be formed, as shown in FIG. 5. By arranging in accordance with the preferred embodiment, the effect of reducing the damping or delay of the signal transmitted in a gate wiring can be obtained, since the wiring 68 is placed in parallel with the gate wiring 65, and the level of the parasitic capacity between the two wirings is small.

Figure 11:
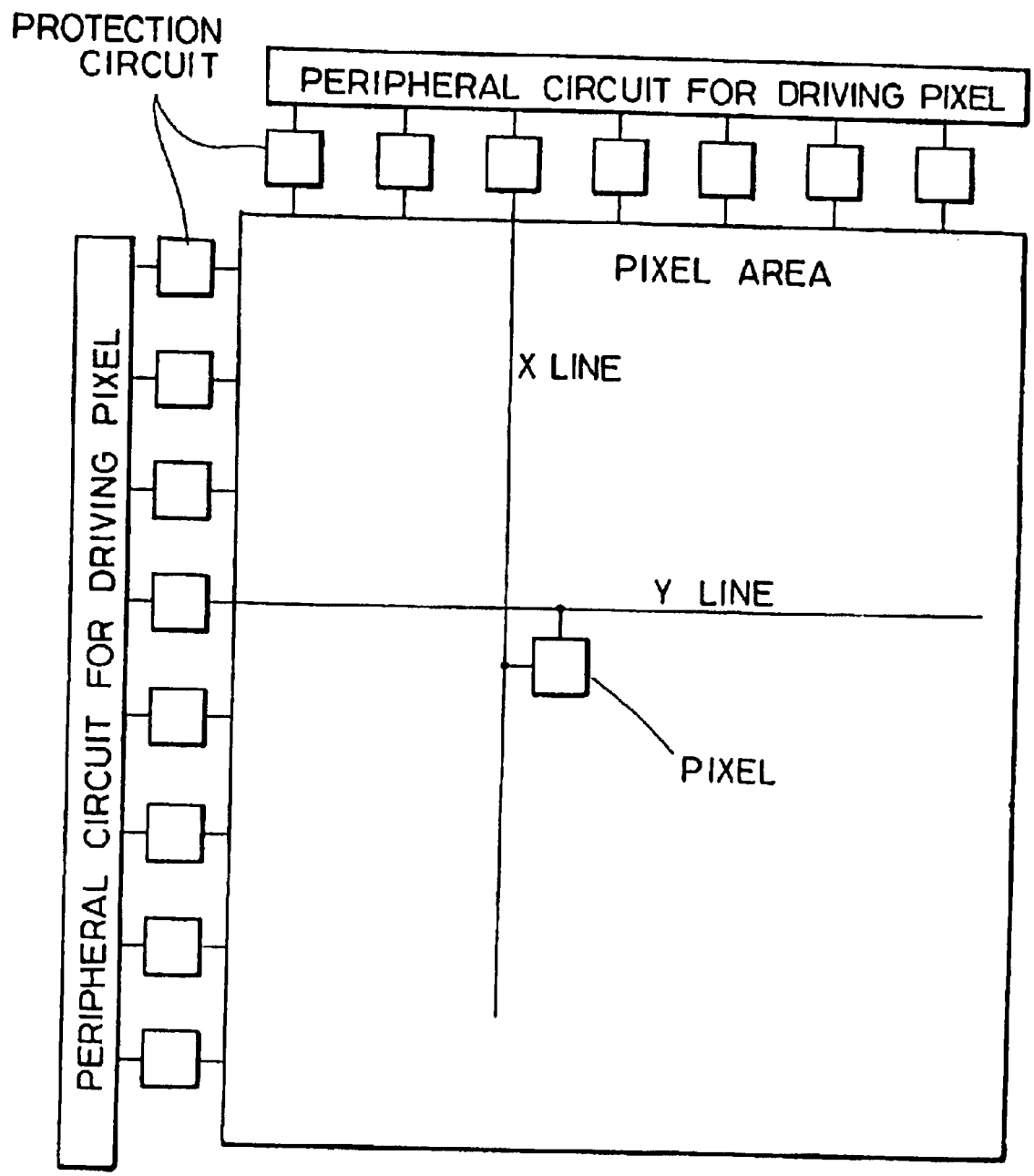
FIG. 11 shows an example of the connection of a protection network.
Figure 13A:
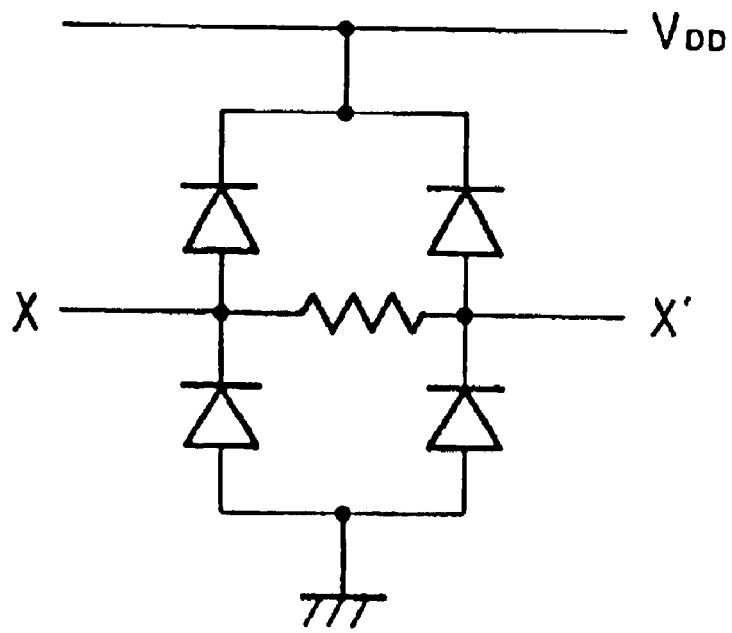
FIGS. 13(A)–(B) show examples of protection circuits.
Figure 13B:
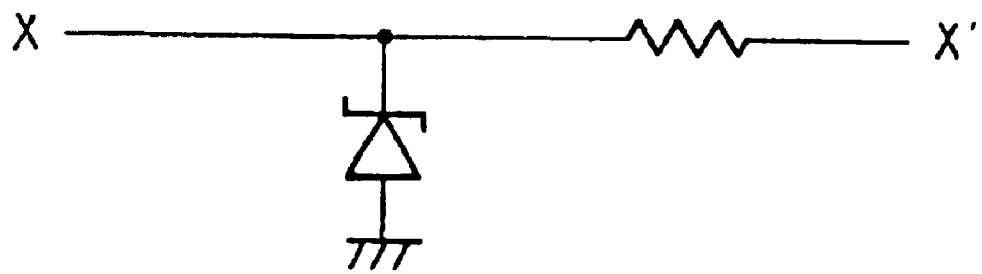

When the wiring 68 thus formed is to be used in a grounded form, it can be used as a grounding conductor of a protection network provided on the tailing end of each matrix. The protection network is a circuit as shown in FIG. 11 provided between a peripheral driving circuit and a picture element. Examples of the protection circuits are shown in FIGS. 12 and 13. Each one will be turned ON when an excessive voltage is applied to the picture element wiring, and has the function of removing voltage thereby. The protection network is formed out of doped semiconductor, un-doped semiconductor material such as silicon, transparent conductive material such as ITO, or of general wiring material. The protection network thus can be formed at the same time when the circuit of the picture element is formed.

This should be clear from the fact that the protection networks shown in FIG. 12 are formed out of NTFT or PTFT, or of C/TFT comprising these. Although the protection networks shown in FIG. 13 do not utilize TFT, a diode has a structure of, for example, PIN junction, and, in particular, the diode which is specially known for the Zener effect has a structure such as NIN, PIP, PNP, NPN, PINIP or NIPIN, and it goes without saying that this can be manufactured by applying the manufacturing method presented in the preferred embodiment.

Regarding the electric characteristics of TFT thus obtained, mobility was 80($cm^2$/Vs), and Vth was 5.0(V). In this manner, one substrate for the electro-optical device was manufactured in accordance with the present invention.

The arrangement of the electrode, etc., of this liquid crystal display device is shown in FIG. 6. The liquid crystal display device having picture elements as many as 640×480, 1280×960, or 1920×400 in this preferred embodiment, can be obtained by repeating such a structure horizontally and vertically. In this way, a first substrate was obtained.

The manufacturing method of the other substrate (a second substrate) is shown in FIG. 10. A polyimide resin for which a black pigment is mixed with polyimide was formed on a glass substrate at a thickness of 1 micrometer by a spin-coating method, and a black stripe 81 was manufactured by using an eighth photomask ⑧, whereafter, the polyimide resin mixed with a red pigment was formed at a thickness of 1 micrometer by the spin-coating method, and a red filter 83 was manufactured using a ninth photomask ⑨. A green filter 85 and a blue filter 86 were formed in the same manner, using masks ⑩ and ⑪. Each filter was baked in nitrogen at a temperature of 350° C., for sixty minutes, at the time of manufacturing thereof. A leveling layer 89 was then manufactured using transparent polyimide, again by spin-coating.

An ITO(indium tin oxide) was then sputtered over all of these at a thickness of 0.1 micrometer, and a common electrode 90 was formed using a twelfth photomask ⑫. The ITO was formed at a temperature ranging from room temperature to 150° C., and was subjected to the annealing process in oxygen or atmosphere at a temperature of 200–300° C., and a second substrate was thus obtained.

A polyimide precursor was then printed on the above-mentioned substrate using an offset method, and was baked in a non-oxidating atmosphere, e.g. in nitrogen, for an hour, at a temperature of 350° C. It was then subjected to a known rubbing method, and the quality of the polyimide surface was modified thereby, and whereby a means for orienting a liquid crystal molecule in a specific direction at least in an initial stage, was provided.

A nematic liquid crystal composition was sandwiched by the first and the second substrates formed in the way as described supra, and the periphery thereof was fixed with an epoxy bonding agent. An electro-optical modulating layer comprising the liquid crystal composition was then formed between the first and the second substrates. A PCB having an electric potential wiring, a common signal and a TAB driver IC was connected to the lead on the substrate, while a polarizing plate was adhered to the outside, and a transmission-type liquid crystal electro-optical device was obtained thereby. A rear lightning device provided with three pieces of cold cathode tubes, and a tuner for receiving television radio wave, were connected to the liquid crystal electro-optical device, and the wall mounted television set was completed thereby. Since the device has a flatter shape than the conventional CRT television, it can be installed on the wall and the like. The operation of the present liquid crystal television with 8 gradation levels was verified by applying the signal which is substantially equal to the one shown in FIG. 2, to the liquid crystal picture element. At this time, $T_1$=4 msec. and pulse widths (or shortest pulse widths) applied to X-lines and Y-lines are 5 μsec. and 8 μsec., respectively.

Preferred Embodiment 2

In this embodiment, a wall mounted television set manufactured by using a liquid crystal display device having a circuit structure as shown in FIG. 5, will be explained. Polycrystalline silicon subjected to laser annealing was used for TFT.

Figure 9A:
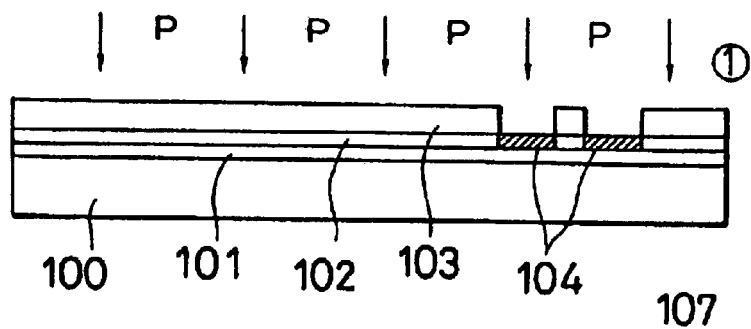
FIGS. 9(A)–(F) show a process of TFT in accordance with the preferred embodiment.

The manufacturing of a TFT part will be described infra according to FIG. 9. Referring to FIG. 9(A), a silicon oxide film was manufactured as a blocking layer 101 on an inexpensive glass substrate 100 which bears the heat treatment of not more than 700° C., e.g. approximately 600° C., at a thickness of 1000–3600 angstroms by magnetron RF(high frequency) sputtering. The is conditions for the process were: in 100% oxygen atmosphere; the temperature for film formation was 15° C.; output was 400–800 W; and, pressure was 0.5 Pa. The rate of film formation was 30–100 angstroms/min, when quartz or single crystalline silicon was used as a target.

A silicon film 102 was manufactured thereon by plasma CVD. The temperature for film formation was 250° C.–350° C., e.g. 320° C. In this embodiment, mono-silane ($SiH_4$) was used, however, disilane ($Si_2H_6$) or trisilane ($Si_3H_8$) can be used instead. These were introduced into a PCVD device at a pressure 3 Pa, and the film formation was carried out by applying high frequency power of 13.56 MHz thereto. The high frequency power should be 0.02–0.10 W/$cm^2$, or 0.055 W/$cm^2$ in this embodiment. The flow rate of mono-silane ($SiH_4$) was 20 SCCM, and the rate of film formation was approximately 120 angstroms/min. The silicon film may be an intrinsic semiconductor or boron may be added to the film by means of diborane during the film formation at a concentration of $1×10^{15}$–$1×10^{18}$ $cm^{-3}$. When a silicon layer that will be a channel region of TFT is to be formed, sputtering or low pressure CVD can be employed instead of plasma CVD, which will be briefly described infra.

In case of sputtering, the back pressure before sputtering should be not more than $1×10^{-5}$ Pa, and the sputtering was carried out in the atmosphere for which 20–80% of hydrogen was mixed with argon; e.g. 20% of argon and 80% of hydrogen. The target was single crystal silicon. The temperature for film formation was 150° C.; frequency was 13.56 MHz; sputtering output was 400–800 W; and, pressure was 0.5 Pa.

In case of carrying out low pressure CVD, film formation was carried out by supplying disilane ($Si_2H_6$) or trisilane ($Si_3H_8$) to a CVD device at a temperature of 450–550° C., 100–200° C. lower than the temperature for crystallization, e.g. at 530° C. The pressure in a reactor was 30–300 Pa. The rate of film formation was 50–250 angstroms/min.

Oxygen in the film thus formed should be not more than $5\times10^{21}$ cm$^{-3}$. Oxygen concentration should be not more than $7\times10^{19}$ cm$^{-3}$, or preferably not more than $1\times10^{19}$ cm$^{-3}$, so as to promote crystallization, however, if it is too low, the leakage current in OFF state will be increased due to the illumination of a back light, thus the abovementioned level is supposed to be optimum. If oxygen concentration is too high, crystallization will not be facilitated, and the temperature for laser annealing must be higher or the time for laser annealing longer. Hydrogen concentration was $4\times10^{20}$ cm$^{-3}$, or one atom % compared with the silicon at a concentration of $4\times10^{22}$ cm$^{-3}$.

Oxygen concentration should be not more than $7\times10^{19}$ cm$^{-3}$, preferably not more than $1\times10^{19}$ cm$^{-3}$, in order to promote crystallization for source and drain, and oxygen can be ion-implanted only into channel forming regions of TFTs constituting pixels, at a concentration of $5\times10^{20}$–$5\times10^{21}$ cm$^{-3}$. The silicon film in amorphous state was thus formed by 500–5000 angstroms, or by 1000 angstroms in this embodiment.

A photoresist pattern 103 having openings therein only over regions to be source and drain regions of NTFT was then formed by using a mask ①. Phosphorus ion was ion-implanted at concentrations $2\times10^{14}$–$5\times10^{16}$ cm$^{-2}$, preferably at $2\times10^{16}$ cm$^{-2}$ by using the resist 103 as a mask, and n-type impurity regions 104 were formed thereby, and the resist 103 was removed thereafter.

Figure 9B:
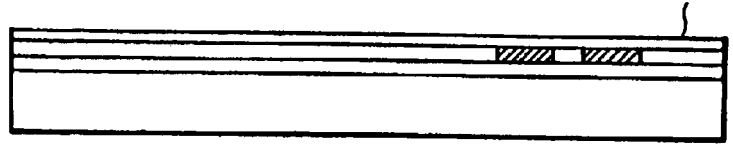
Figure 9C:
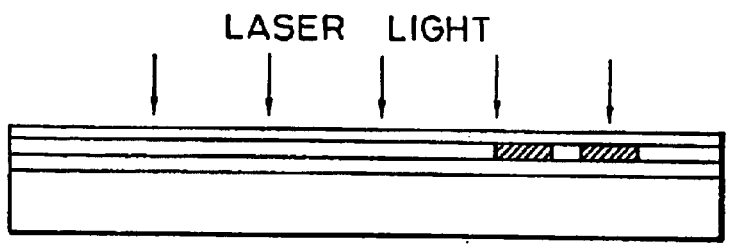

A silicon oxide film 107 of 50–300 nm thick, e.g. 100 nm thick was then formed on the silicon film 102, by the abovementioned RF sputtering as shown in FIG. 9(B). Source, drain and channel regions were crystallized and activated through laser annealing using a XeCl excimer laser. The threshold level of the laser energy was 130 mJ/cm$^2$, and 220 mJ/cm$^2$ is necessary so as to melt the entire film. If the energy of no less than 220 mJ/cm$^2$ is irradiated from the start, the film will be damaged, since the hydrogen existing in the film is abruptly ejected. For this reason, the film must be melted only after the hydrogen is purged out first at a low energy. In this embodiment, after hydrogen was purged out at an energy of 150 mJ/cm$^2$, crystallization was carried out at 230 mJ/cm$^2$. After the laser annealing was completed, the silicon oxide film 107 was removed.

Otherwise, the crystallization can be carried out by thermal annealing. The thermal annealing process may be a heating process at a temperature of 450° C. to 700° C., preferably 550° C. to 600° C., for 12 to 70 hours, e.g. 24 hours, in a non-oxidating atmosphere, e.g. hydrogen or nitrogen atmosphere.

Island-like NTFT region 111 was then formed by a photomask ②. A silicon oxide film 108 was formed thereupon as a gate insulating film at a thickness of 500–2000 angstroms, e.g. 1000 angstroms. The manufacturing conditions were the same as for those of the silicon oxide film as a blocking layer. A little amount of fluorine may be added to the film during the manufacturing thereof, so as to stabilize sodium ion.

Figure 9D:
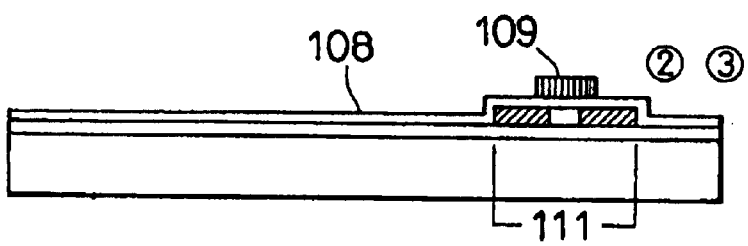

A silicon film containing therein phosphorus at a concentration of 1–$5\times10^{21}$ cm$^{-3}$ or a multi-layered film comprising this silicon film and a molybdenum (Mo), tungsten (W), MoSi$_2$ or WSi$_2$ film formed thereon, was formed thereupon. This was patterned by a third photomask ③, to form a gate electrode 109 for NTFT as shown in FIG. 9(D). For example, the channel length was 7 micrometer and as a gate electrode phosphorus-doped silicon layer was formed at a thickness of 0.2 micrometer and molybdenum layer was formed thereon at a thickness of 0.3 micrometer. A gate wiring and a wiring in parallel therewith were formed in the same way as in the case of the Preferred Embodiment 1.

As a material for these wirings, other material than described above, e.g. aluminum (Al) can be used.

In case of using aluminum (Al) as a gate electrode material, since a self-aligning process is available by anodic-oxidating the surface of the aluminum which is primarily patterned by a third photomask ③, the contact holes of source and drain can be formed closer to the gate, and TFT characteristic is further improved due to the increase in mobility and the reduction in threshold voltage.

Figure 9E:
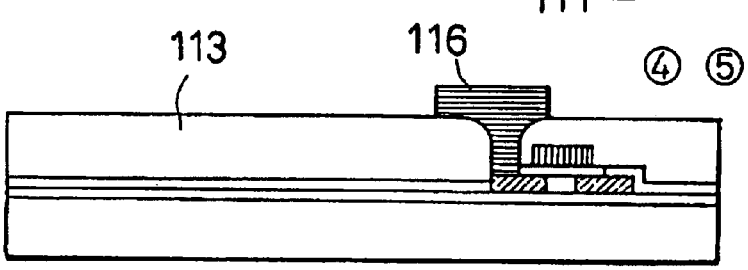
Figure 9F:
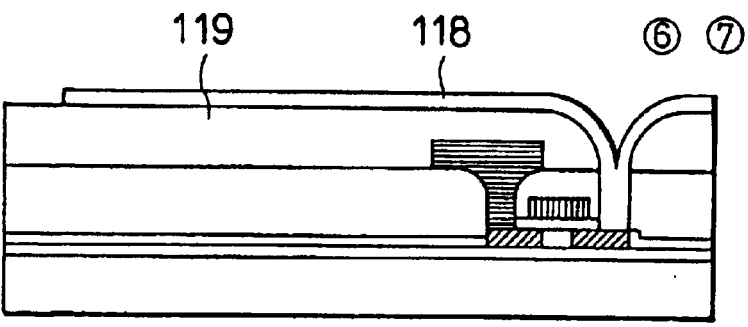
Figure 10A:
FIGS. 10(A)–(E) show a production process of a color filter in accordance with the preferred embodiment.
Figure 10B:
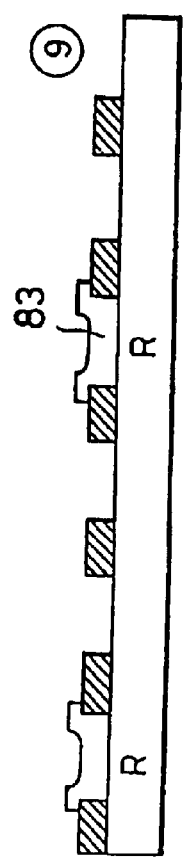
Figure 10C:
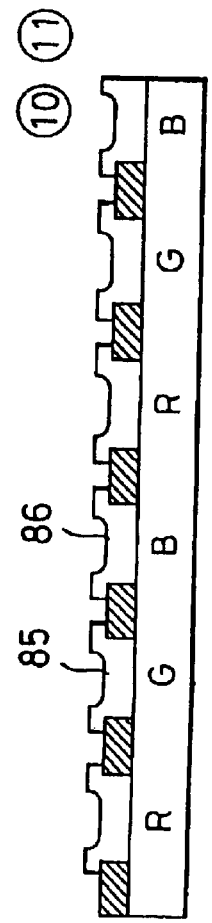
Figure 10D:
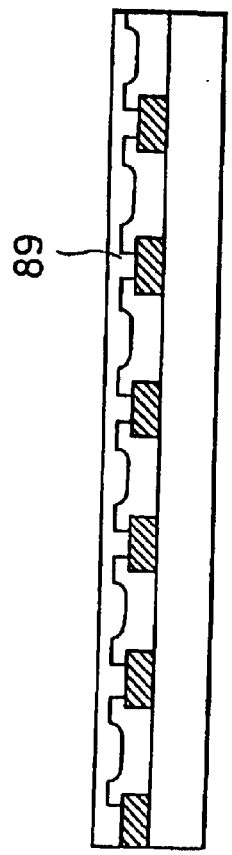
Figure 10E:
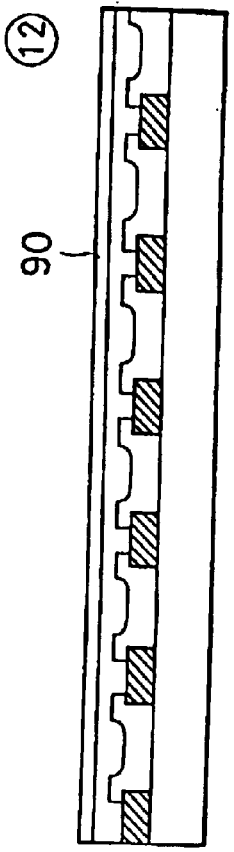

Referring to FIG. 9(E), a silicon oxide film was formed as an inter-layer insulator 113 by sputtering in the way described supra. The silicon oxide film can be formed by LPCVD, photo-CVD, or by atmospheric pressure CVD, at a thickness of 0.2–0.6 micrometer, for example, and an opening 117 for electrode was then formed by using a fourth photomask ④. Aluminum was further sputtered over the entire surface of these at a thickness of 0.3 micrometer, and, after a lead 116 and a contact 114 were manufactured by using a fifth photomask ⑤, an organic resin 119 for flattening, e.g. a transparent polyimide resin was applied to the surface thereof, and an opening for an electrode was formed by using a sixth photomask ⑥. An ITO (indium tin oxide) was sputtered on the entire surface of these at a thickness of 0.1 micrometer, and a picture element electrode 118 was formed by using a seventh photomask ⑦ so that a surface of the picture element electrode is rounded along the rounded edge of the organic resin film. The ITO was formed at a temperature ranging from room temperature to 150° C., and was then subjected to annealing process in atmosphere or in oxygen at a temperature of 200–400° C.

The electric characteristic of the TFT thus obtained was: mobility of 90 (cm$^2$/Vs) and Vth of 4.8 (V).

In this way, a first substrate for the liquid crystal electro-optical device was obtained. The manufacture of the other substrate (a second substrate), which is the same as described in the preferred embodiment 1, is omitted here. A nematic liquid crystal composition was then sandwiched by the abovementioned first and second substrates, and the periphery thereof was fixed by an epoxy bonding agent. PCB having an electric potential wiring, a common signal, and a TAB-shaped driver IC were connected to the lead on the substrate, and a polarizing plate was adhered to the outside, and a transmission type liquid crystal electro-optical device was thus obtained. A wall mounted television set was completed by connecting this device with a tuner for receiving television electric wave and a rear lighting device comprising three pieces of cold cathode-ray tubes. Since the device becomes flatter compared with a conventional CRT type television, it can be installed on the wall and the like. The operation of the liquid crystal television with 128 gradation levels was verified by applying the signal substantially the same as the one shown in FIG. 2, to a liquid crystal picture element.

Preferred Embodiment 3

Figure 20:
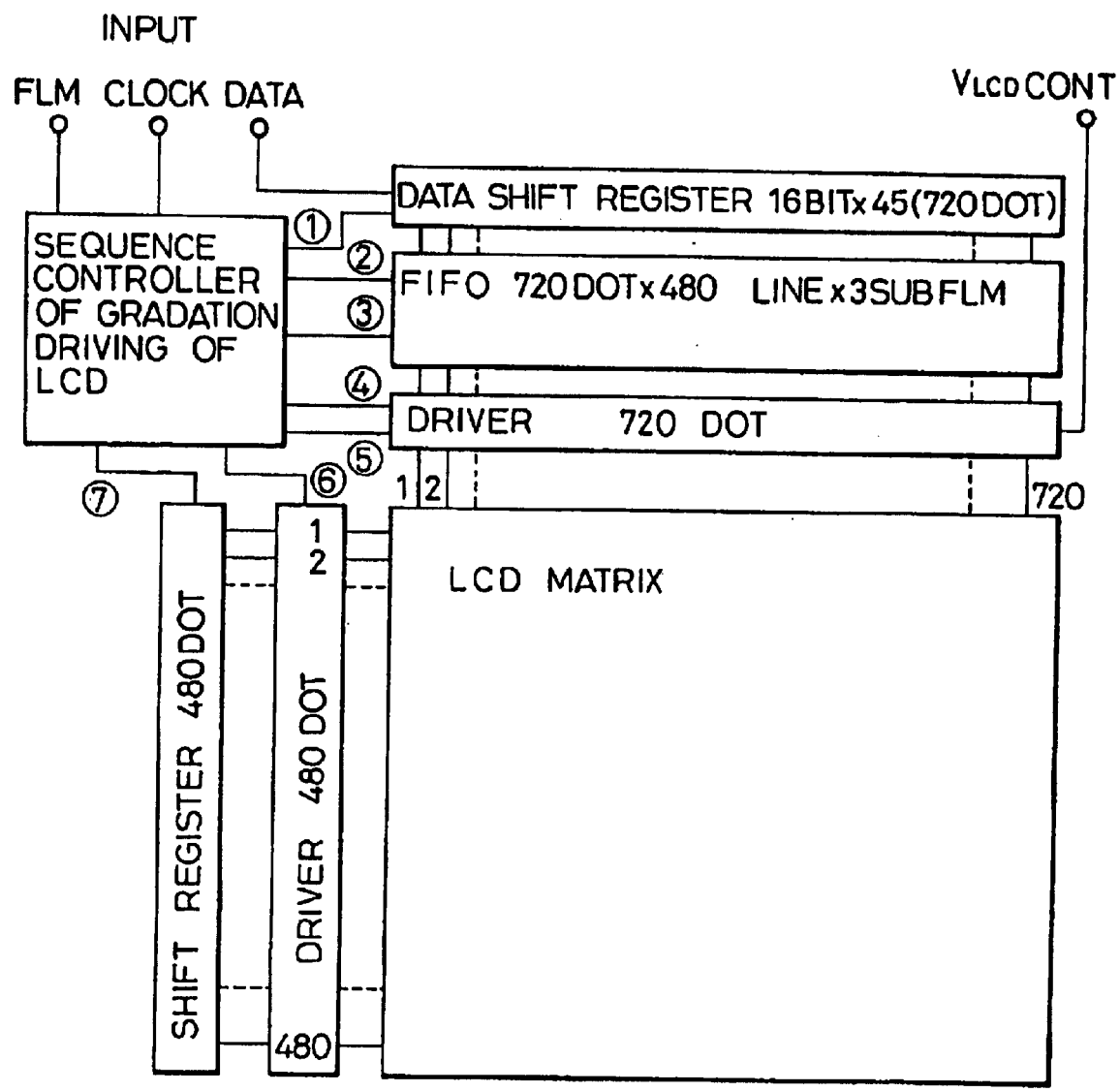
FIG. 20 shows a block figure of a liquid crystal display device in accordance with the preferred embodiment.
Figure 21:
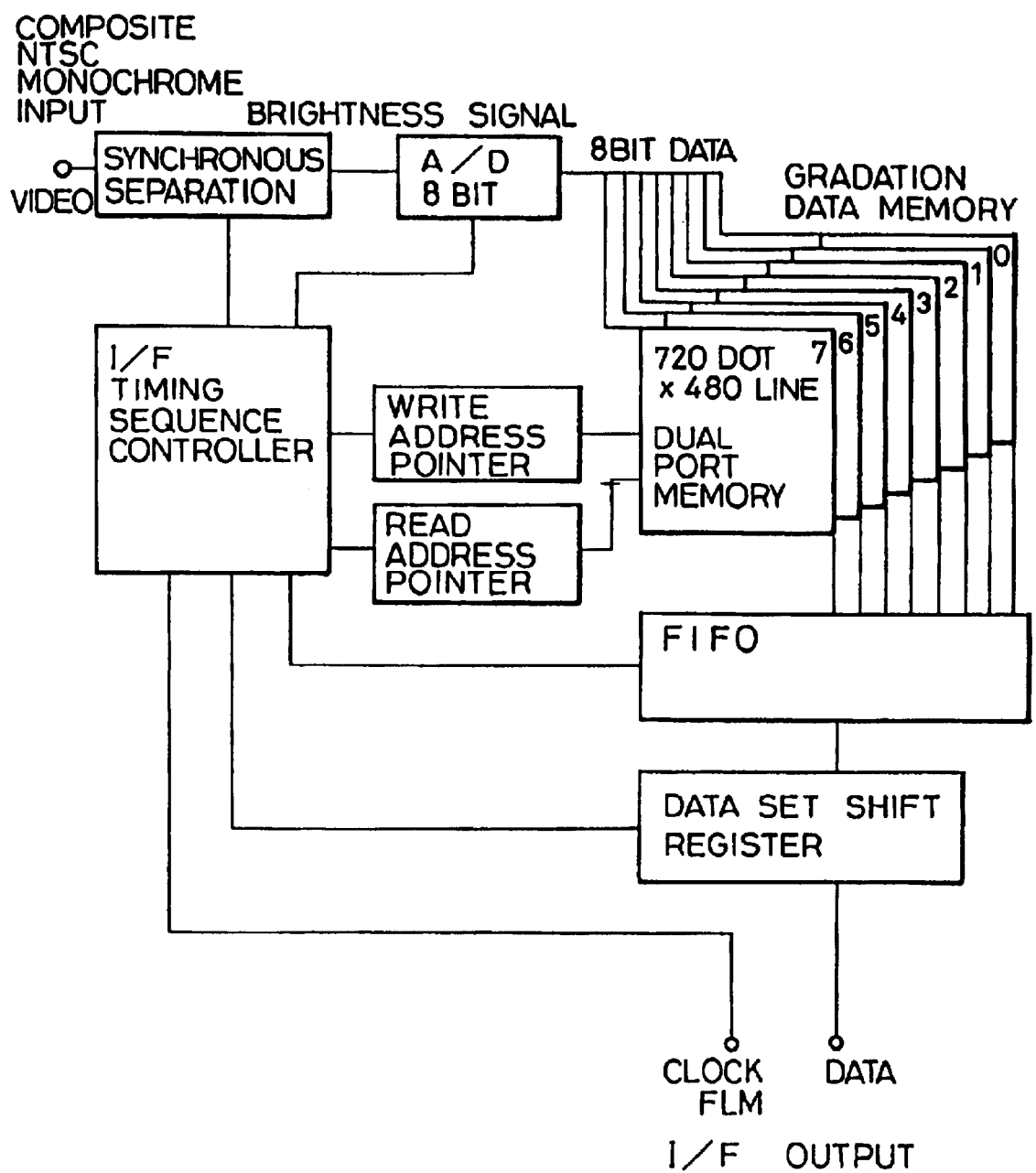
FIG. 21 shows a block figure of a liquid crystal display device in accordance with the preferred embodiment.
Figure 22:
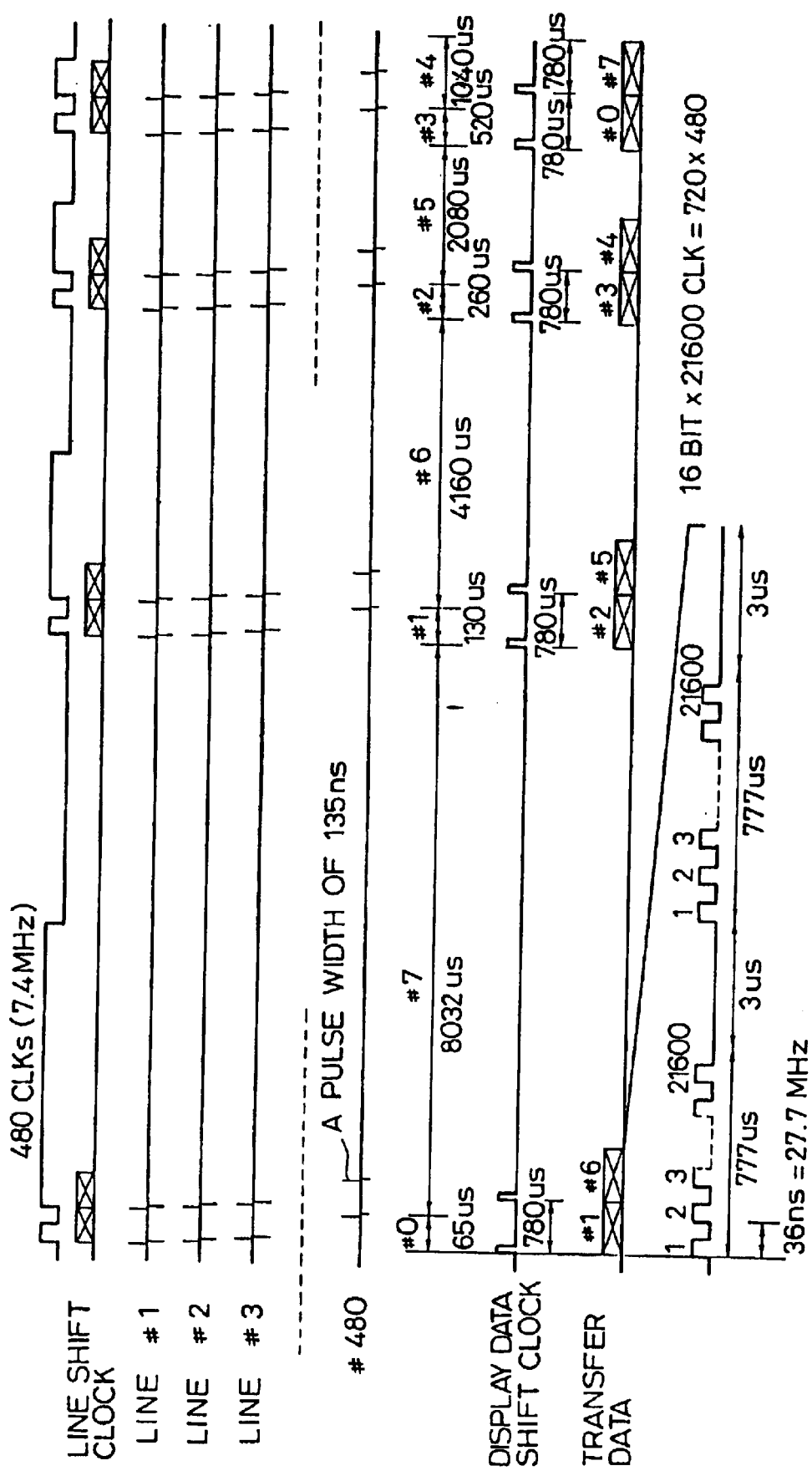
FIG. 22 shows an example of a driving signal in accordance with the preferred embodiment.
Figure 23:
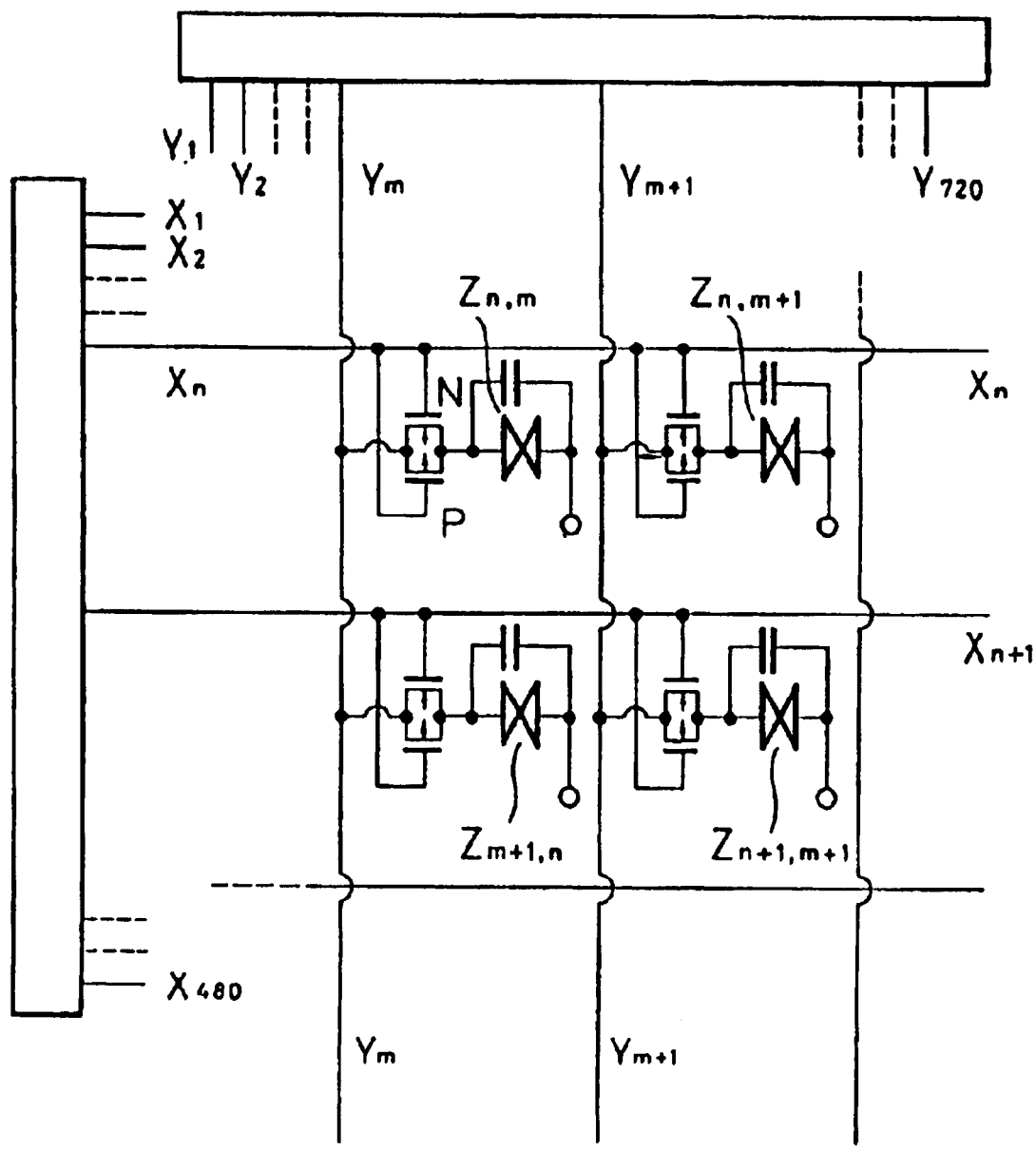
FIG. 23 shows an example of a matrix form in accordance with the preferred embodiment.
Figure 24:
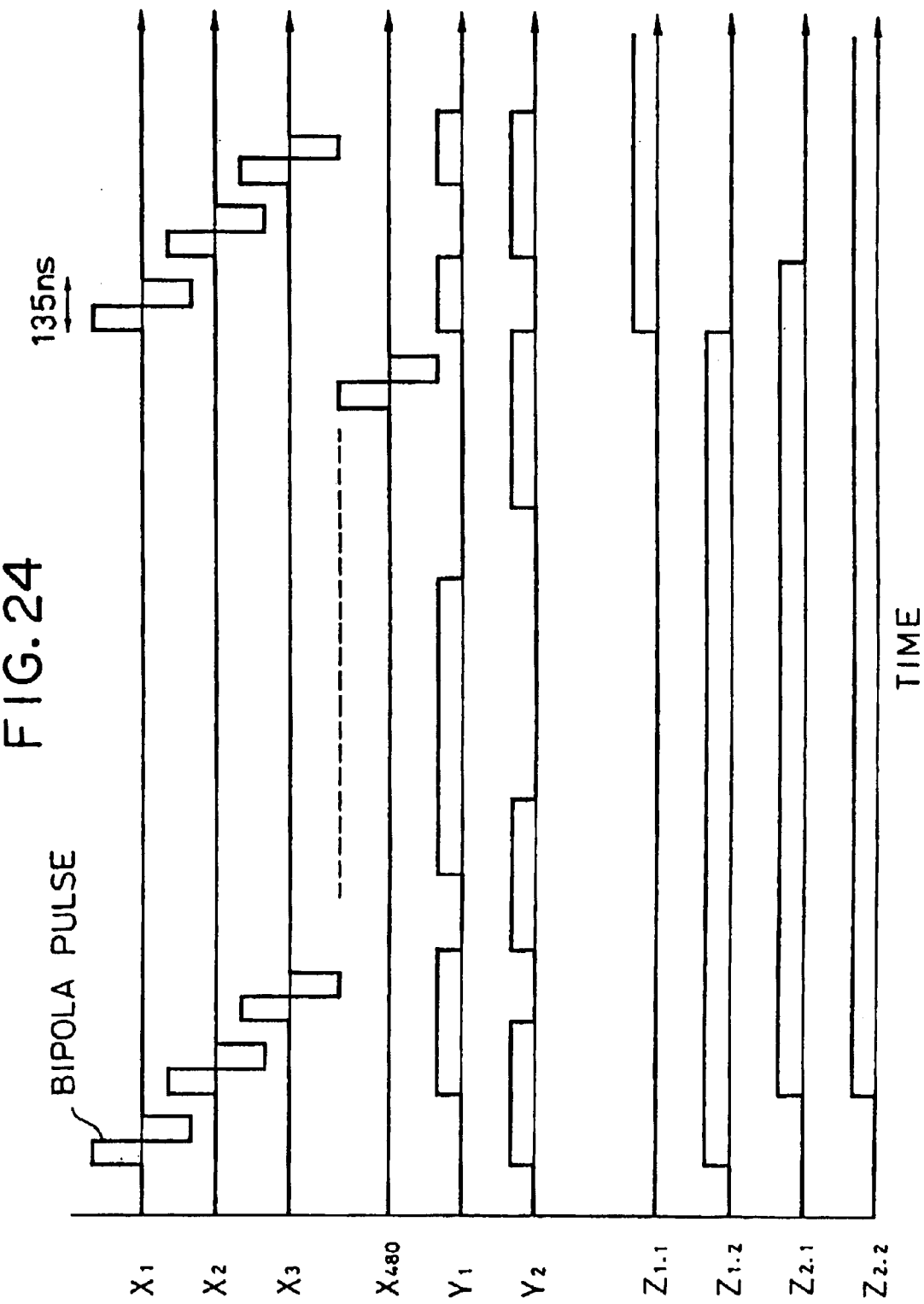
FIG. 24 shows an example of a driving signal in accordance with the preferred embodiment.

A device used when an actual monochrome television (NTSC) was driven in accordance with the present invention, is shown in FIGS. 20, 21 and 23, and examples of driving signals are shown in FIGS. 22 and 24.

A screen of the television and a peripheral circuit thereof are shown in FIG. 20, and the size of the matrix of the screen is 720×480. FIFO is thus of 720×480×3=1036800 bits, and a driver and a shift register of X-line are of 480 dots, while those of Y-line are of 720 dots. A data shift register of Y-line was of 18 bits×45. The timings of these were controlled by a sequence controller of gradation driving of LCD.

A polysilicon TFT CMOS (complementary field effect device) transfer gate circuit was used to form a matrix of the screen. The schematic circuit diagram related to the four picture elements is shown in FIG. 23. At the time of manufacturing, a normal low temperature thermal annealing crystallization method was adopted. The detailed explanation thereof is omitted. In order to effectively operate such a circuit at a high speed, a pulse which is reversed in its polarity (hereinafter referred to as bipolar pulse) will be applied to the X-line connected with the control electrode of the circuit, as shown in FIG. 24. The order of alternating polarity, the height, or the width of the bipolar pulse are to be designed according to the characteristic of a device. An operational example of the transfer gate circuit is shown in FIG. 24, which is basically the same as the case where a normal NMOS type circuit is used, except that a bipolar pulse is used.

A block figure of the signal process part of the television is shown in FIG. 21. After a normal analog image signal was synchronously separated, it was converted into an 8-bit digital image signal by an analog-digital converter (A/D 8 bit), and after the signal was temporarily stored in a dual port memory of 720 dot×480 dot×8 bit, which served as a data memory for each gradation display, the signal was sent to a FIFO of next step, which is different from the FIFO in the periphery of a matrix, in the order as shown in FIG. 17, and is outputted to a data input terminal as shown in FIG. 20 from the FIFO, via a data set shift register. A monolithic IC was used for the entire peripheral circuit, and a driver output terminal was connected to X-line as well as to Y-line by a known TAB method.

It is also possible to manufacture the peripheral circuit of a matrix, in particular, a driver, FIFO, or a shift register, out of polysilicon at the same time with the matrix. In this case, since the process of connecting a lot of X-lines and Y-lines is not necessary, the production yield can be improved, while the price can be reduced.

The signal to be applied to the circuit is shown in FIG. 22. The pulse width of the signal applied to X-line was defined as 135 nsec. Since a 16-bit data bus was used for the data transfer to the data shift register, a pulse of 21600 clock was used for the transfer of the data (720×480) per 1-bit. The time for data transfer per 1-bit was defined as 780 microsec, while no signal was applied, for example, between the data of #6 and the data of #2, only for 3 microsec. The frequency of the data for that purpose was 27.7 MHz. In this manner, the monochrome projected image of 256 gradations was obtained by the liquid crystal device.

The present invention is characterized by the digital method of gradation display, compared with a conventional analog method of gradation display. In case of a liquid crystal electro-optical device having 640×400 dots or picture elements, it was with enormous difficulty to manufacture the device without difference in characteristic of every TFT that amounts to total 256,000 pieces, and in practice, a 16 gradations display is assumed to be an upper limit in consideration of mass productivity and yield. However, the display of not less than 256 gradations has become possible according to the present invention, without applying any analog signal at all, but through completely digital control. There are no ambiguity in gradation due to difference in characteristics of TFTS, for this method is a completely digital display, and even if there is any difference in characteristics of TFTs to some extent, a thoroughly homogeneous gradation display is possible. Since there is no more substantial problem with regard to difference in characteristic of TFT, according to the present invention, compared with a conventional method where there was substantial problem of poor yield at the time of manufacturing TFTs of little difference in its characteristics, the yield of the TFT is improved, while a manufacturing cost is drastically reduced, according to the present invention.

In case of carrying out conventional analog gradation display by a liquid crystal electro-optical device which is composed of 258,000 groups of TFTs of 640×400 dots in a 300 mm square, a 16 gradations display was an upper limit, for there was difference in characteristics of the TFTs by approximately ±10%. When a digital gradation display is carried out in accordance with the present invention, a 256 gradations display is possible, and a various and subtle color display of as many as 16,777,216 colors is achieved, being little influenced by difference in the characteristics of TFT devices. When a software of such as a television image is to be projected, a "rock", for example, of the same color should be subtly different in its color due to a lot of very small recesses and the like thereupon. When a display as close to the nature as possible is to be carried out, it is difficult with a 16-gradation display, however, the fine variation in color tone has become possible with the gradation display in accordance with the present invention.

Although the TFT utilizing silicon was primarily explained in the preferred embodiment in accordance with the present invention, the TFT utilizing germanium can be used in the same way. A single crystalline germanium is a most suitable material for implementing the present invention that requires high-speed operation, since the characteristics thereof exceed those of single crystalline silicon. Electron mobility of single crystalline germanium is 3600 cm$^2$/Vs, Hall mobility thereof is 1800 cm$^2$/Vs, whereas electron mobility of single crystalline silicon is 1350 cm$^2$/Vs, and Hall mobility thereof is 480 cm$^2$/Vs. The transition temperature of germanium from an amorphous state to crystal state, is lower than that of silicon, which means that germanium is suitable for low temperature process. The generation ratio of crystal nucleus at the time of growing germanium crystal is low, which means, in general, a large crystal can be obtained when it is grown into polycrystalline state. Germanium has thus a characteristic that can bear comparison with silicon's.

Although an electro-optical device utilizing liquid crystal, and, in particular, a display device utilizing liquid crystal are primarily referred to in order to explain a technical idea of the present invention, the idea of the present invention can be applied to a projection type television, as well as to other devices such as a photoswitch or a photoshutter, instead of display device. And it should be also clear that the present invention can be implemented by using any electro-optical material which is changed in its optical characteristic when electrically affected by electric field, voltage and so on, instead of by using liquid crystal. It is also clear that the present invention can be implemented by using other operational mode of liquid crystal including, for example, a guest-host mode, than the mode explained supra.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to the particular use contemplated. An example of such modifications is as follows.

Figure 25:
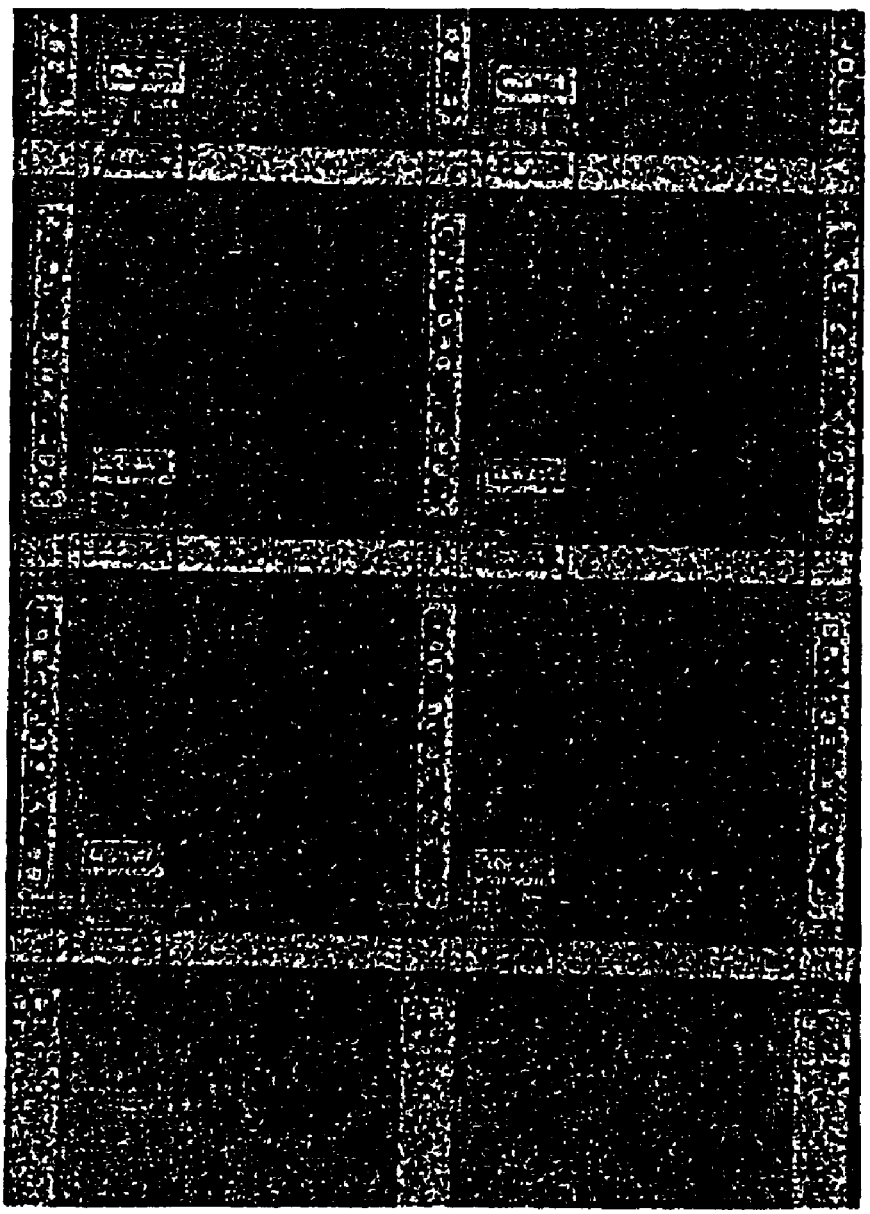
FIG. 25 is a copy of a photograph showing an electric circuit in accordance with the present invention and FIG. 26 is an exemplary embodiment of the display device used for a television.

FIG. 25 is a copy of a photograph showing an electric circuit which was actually manufactured in accordance with the present invention. The electric circuit shown in FIG. 25 is a modification of the electric circuit shown in FIG. 23 and is different from the electric circuit shown in FIG. 2 in that no capacitor is provided in parallel with a picture element in the electric circuit shown in FIG. 25.

Figure 26:
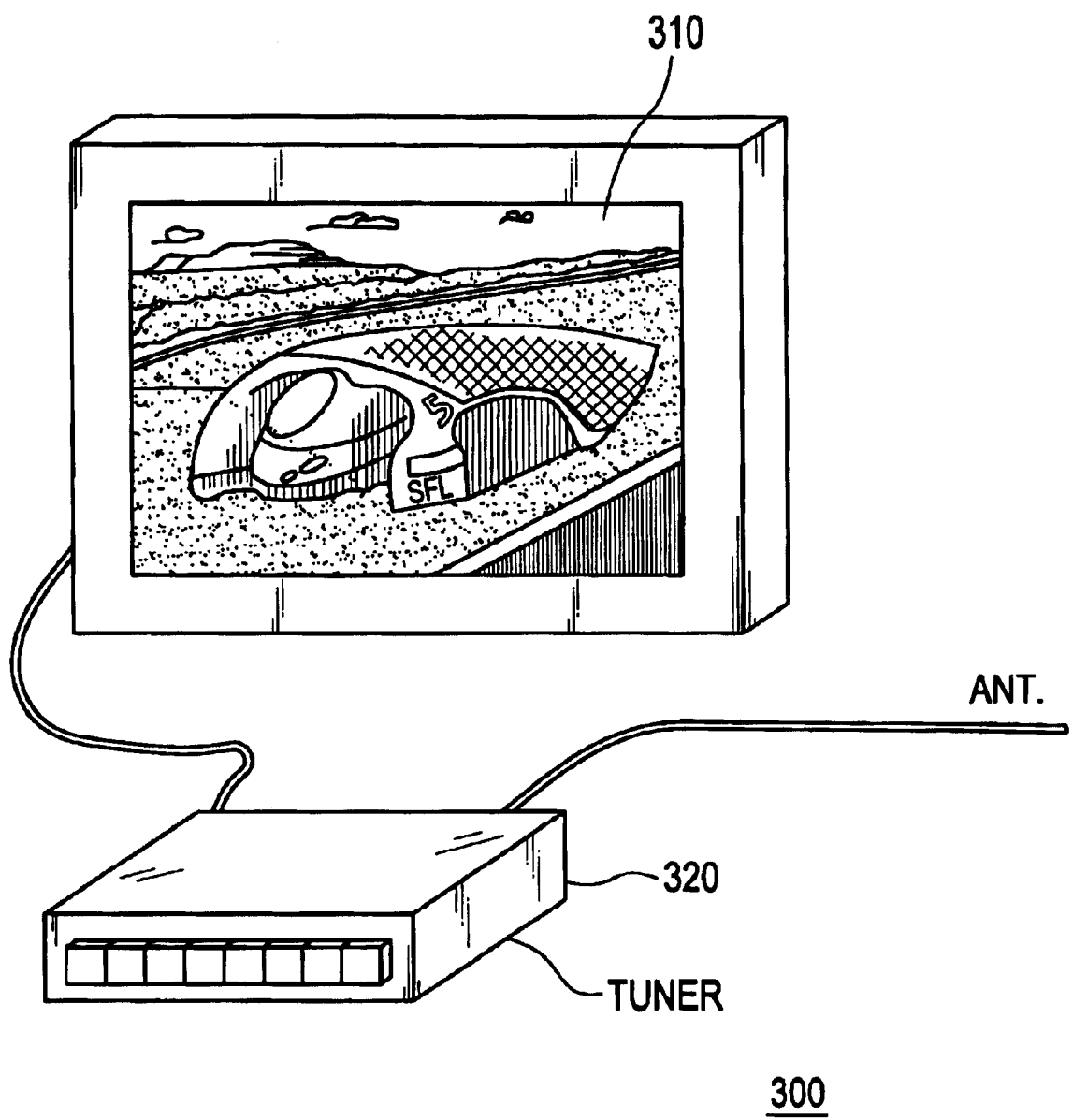

FIG. 26 illustrates the display device used for a television. In particular, the television 300 comprises a display device 310 and a tuner 320.

What is claimed is:

1. A display device comprising:
   a substrate having an insulating surface;
   at least one thin film transistor formed on said insulating surface, said thin film transistor having a semiconductor film comprising silicon as an active layer thereof;
   an interlayer insulating film comprising an inorganic material formed on said thin film transistor;
   a first contact hole in said interlayer insulating film;
   a wiring formed on said interlayer insulating film and electrically connected to said thin film transistor through said first contact hole formed in said interlayer insulating film;
   a leveling film comprising an organic resin to provide a leveled upper surface over said thin film transistor;
   a second contact hole through said leveling film and said interlayer insulating film; and
   a pixel electrode formed over said leveled upper surface and directly connected to said semiconductor film of said thin film transistor through said second contact hole,
   wherein an edge of said leveling film at a periphery of said second contact hole is rounded,
   wherein a surface of said pixel electrode is rounded along the rounded edge of said leveling film.

2. A display device according to claim 1 wherein said semiconductor film comprises crystalline silicon.

3. A display device according to claim 1 wherein said thin film transistor further comprises a gate electrode located over said semiconductor film with a gate insulating film interposed therebetween.

4. A display device according to claim 1 wherein said organic resin comprises polyimide.

5. A display device according to claim 1 wherein said pixel electrode comprises a transparent conductive film.

6. A display device according to claim 1 wherein said display is a digital gradation display.

7. A display device according to claim 1 wherein said display further comprises a tuner for receiving television radio wave to constitute a television.

8. A display device according to claim 7 wherein said television is a liquid crystal television.

9. A display device according to claim 1 wherein said thin film transistor has at least one gate electrode adjacent to said semiconductor film, said gate electrode comprising a material selected from the group consisting of silicon, molybdenum, tungsten, molybdenum silicide, and tungsten silicide.

10. A display device according to claim 1 wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

11. A display device according to claim 1 wherein said semiconductor film comprises silicon or germanium.

12. A display device comprising:
    a substrate having an insulating surface;
    at least one thin film transistor formed on said insulating surface, said thin film transistor having a semiconductor film comprising silicon as an active layer thereof;
    an interlayer insulating film over said thin film transistor, said interlayer insulating film comprising an inorganic material;
    a leveling film comprising an organic resin formed over said interlayer insulating film and said thin film transistor; and
    a pixel electrode formed over said leveling film and directly connected to said semiconductor film of said thin film transistor through an opening provided in said leveling film,
    wherein an edge of said leveling film at a periphery of said opening is rounded,
    wherein a surface of said pixel electrode is rounded along the rounded edge of said leveling film.

13. A display device according to claim 12 wherein said semiconductor film comprises crystalline silicon.

14. A display device according to claim 12 wherein said thin film transistor further comprises a gate electrode located over said semiconductor film with a gate insulating film interposed therebetween.

15. A display device according to claim 12 wherein said organic resin comprises polyimide.

16. A display device according to claim 12 wherein said pixel electrode comprises a transparent conductive film.

17. A display device according to claim 12 wherein said display is a digital gradation display.

18. A display device according to claim 12 wherein said display further comprises a tuner for receiving television radio wave to constitute a television.

19. A display device according to claim 18 wherein said television is a liquid crystal television.

20. A display device according to claim 12 wherein said thin film transistor has at least one gate electrode adjacent to said semiconductor film, said gate electrode comprising a material selected from the group consisting of silicon, molybdenum, tungsten, molybdenum silicide, and tungsten silicide.

21. A display device according to claim 12 wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

22. A display device according to claim 12 wherein said semiconductor film comprises silicon or germanium.

23. A display device comprising:
    a plurality of thin film transistors formed on an insulating surface, each of said thin film transistors comprising at least a semiconductor film;
    an interlayer insulating film formed on the thin film transistors, said interlayer insulating film comprising an inorganic material;
    first openings formed in the interlayer insulating film on the respective transistors;
    a leveling layer formed over said interlayer insulating film to provide a leveled upper surface, wherein said leveling layer comprises an organic resin and is prevented from directly contacting said semiconductor film by said interlayer insulating film;

second openings through said leveling layer and said interlayer insulating film over the respective transistors; and pixel electrodes formed over said leveled upper surface, each of said pixel electrodes being directly connected to said semiconductor film of the corresponding transistors through the corresponding second openings, wherein an edge of said leveling layer at a periphery of each of said second openings is rounded, wherein a surface of each of said pixel electrodes is rounded along the rounded edge of said leveling layer.

24. A display device according to claim 23 wherein said semiconductor film comprises crystalline silicon.

25. A display device according to claim 23 wherein said thin film transistor further comprises a gate electrode located over said semiconductor film with a gate insulating film interposed therebetween.

26. A display device according to claim 23 wherein said organic resin comprises polyimide.

27. A display device according to claim 23 wherein said pixel electrode comprises a transparent conductive film.

28. A display device according to claim 23 wherein said display is a digital gradation display.

29. A display device according to claim 23 wherein said display further comprises a tuner for receiving television radio wave to constitute a television.

30. A display device according to claim 29 wherein said television is a liquid crystal television.

31. A display device according to claim 23 wherein said thin film transistor has at least one gate electrode adjacent to said semiconductor film, said gate electrode comprising a material selected from the group consisting of silicon, molybdenum, tungsten, molybdenum silicide, and tungsten silicide.

32. A display device according to claim 23 wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

33. A display device according to claim 23 wherein said semiconductor film comprises silicon or germanium.

34. A display device comprising:
at least one thin film transistor formed over a substrate, said thin film transistor having a semiconductor film comprising silicon as an active layer thereof and a gate electrode adjacent to said semiconductor film with a gate insulating film interposed therebetween;
an insulating film comprising an inorganic material formed over said gate electrode;
a first contact hole in said insulating film;
a wiring formed on said insulating film and electrically connected to said semiconductor film through said first contact hole formed in said insulating film;
a leveling film comprising an organic resin to provide a leveled upper surface over said insulating film;
a second contact hole through said leveling film and said insulating film; and
a pixel electrode formed over said leveled upper surface and directly connected to said semiconductor film through said second contact hole,
wherein an edge of said leveling film at a periphery of said second contact hole is rounded,
wherein a surface of said pixel electrode is rounded along the rounded edge of said leveling film.

35. A display device according to claim 34, wherein said semiconductor film comprises crystalline silicon.

36. A display device according to claim 34, wherein said thin film transistor further comprises a gate electrode located over said semiconductor film with a gate insulating film interposed therebetween.

37. A display device according to claim 34, wherein said organic resin comprises polyimide.

38. A display device according to claim 34, wherein said pixel electrode comprises a transparent conductive film.

39. A display device according to claim 34 wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

40. A display device according to claim 34, wherein said display device is a digital gradation display device.

41. A display device comprising:
at least one thin film transistor formed over a substrate, said thin film transistor having a semiconductor film comprising silicon as an active layer thereof and a gate electrode adjacent to said semiconductor film with a gate insulating film interposed therebetween;
an insulating film over said gate electrode, said insulating film comprising an inorganic material;
a leveling film comprising an organic resin formed over said insulating film; and
a pixel electrode formed over said leveling film and directly connected to said semiconductor film through an opening provided in said leveling film,
wherein an edge of said leveling film at a periphery of said opening is rounded, wherein a surface of said pixel electrode is rounded along the rounded edge of said leveling film.

42. A display device according to claim 41, wherein said semiconductor film comprises crystalline silicon.

43. A display device according to claim 41, wherein said thin film transistor further comprises a gate electrode located over said semiconductor film with a gate insulating film interposed therebetween.

44. A display device according to claim 41, wherein said organic resin comprises polyimide.

45. A display device according to claim 41 wherein said pixel electrode comprises a transparent conductive film.

46. A display device according to claim 34, wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

47. A display device according to claim 41, wherein said display device is a digital gradation display device.

48. A television having a display unit and a tuner for receiving television radio wave, said display unit comprising:
at least one thin film transistor formed over a substrate, said thin film transistor having a semiconductor film comprising silicon as an active layer thereof and a gate electrode adjacent to said semiconductor film with a gate insulating film interposed therebetween;
an insulating film comprising an inorganic material formed over said gate electrode;
a first contact hole in said insulating film;

a wiring formed on said insulating film and electrically connected to said semiconductor film through said first contact hole formed in said insulating film;

a leveling film comprising an organic resin to provide a leveled upper surface over said gate electrode;

a second contact hole through said leveling film and said insulating film; and a pixel electrode formed over said leveled upper surface and directly connected to said semiconductor film through said second contact hole, wherein an edge of said leveling film at a periphery of said second contact hole is rounded, wherein a surface of said pixel electrode is rounded along the rounded edge of said leveling film.

49. A television according to claim 48, wherein said semiconductor film comprises crystalline silicon.

50. A television according to claim 48, wherein said thin film transistor further comprises a gate electrode located over said semiconductor film with a gate insulating film interposed therebetween.

51. A television according to claim 48, wherein said organic resin comprises polyimide.

52. A television according to claim 48, wherein said pixel electrode comprises a transparent conductive film.

53. A television according to claim 48, wherein said television is a liquid crystal television.

54. A television according to claim 48, wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

55. A television according to claim 48, wherein said display unit is a digital gradation display device.

56. A television having a display unit and a tuner for receiving television radio wave, said display unit comprising:

at least one thin film transistor formed over a substrate, said thin film transistor having a semiconductor film comprising silicon as an active layer thereof and a gate electrode adjacent to said semiconductor film with a gate insulating film interposed therebetween;

an insulating film over said gate electrode, said insulating film comprising an inorganic material;

a leveling film comprising an organic resin formed over said insulating film; and a pixel electrode formed over said leveling film and directly connected to said semiconductor film through an opening provided in said leveling film, wherein an edge of said organic resin film at a periphery of said opening is rounded, wherein a surface of said pixel electrode is rounded along the rounded edge of said leveling film.

57. A television according to claim 56, wherein said semiconductor film comprises crystalline silicon.

58. A television according to claim 56, wherein said thin film transistor further comprises a gate electrode located over said semiconductor film with a gate insulating film interposed therebetween.

59. A television according to claim 56, wherein said organic resin comprises polyimide.

60. A television according to claim 56, wherein said pixel electrode comprises a transparent conductive film.

61. A television according to claim 56, wherein said television is a liquid crystal television.

62. A television according to claim 56, wherein a liquid crystal material is formed between said substrate and an opposite substrate, said liquid crystal material selected from the group consisting of a twisted nematic liquid crystal, super twisted nematic liquid crystal, ferroelectric liquid crystal, antiferroelectric liquid crystal, dispersion liquid crystal, and polymer liquid crystal.

63. A television according to claim 56 wherein said display unit is a digital gradation display device.

64. A display device comprising:

at least one thin film transistor formed over a substrate, said thin film transistor having a semiconductor film comprising silicon as an active layer thereof and a gate electrode adjacent to said semiconductor film with a gate insulating film interposed therebetween;

an insulating film over said gate electrode, said insulating film comprising an inorganic material;

a leveling film comprising an organic resin formed over said insulating film; and a pixel electrode formed over said leveling film and electrically connected to said semiconductor film through an opening provided in said leveling film, wherein an edge of said leveling film at a periphery of said opening is rounded, wherein a surface of said pixel electrode is rounded along the rounded edge of said leveling film.

65. A display device according to claim 64 wherein said organic resin comprises polyimide.

66. A display device according to claim 64 wherein said pixel electrode comprises a transparent conductive film.

67. A display device according to claim 64 wherein said display is a digital gradation display.

68. A display device comprising:

at least one thin film transistor formed over a substrate, said thin film transistor having a semiconductor film comprising silicon as an active layer thereof and a gate electrode adjacent to said semiconductor film with a gate insulating film interposed therebetween;

an insulating film comprising an inorganic material formed over said gate electrode;

a first contact hole in said insulating film;

a wiring formed on said insulating film and electrically connected to said semiconductor film through said first contact hole formed in said insulating film;

a leveling film comprising an organic resin to provide a leveled upper surface over said insulating film;

a second contact hole through said leveling film; and a pixel electrode formed over said leveled upper surface and electrically connected to said semiconductor film through said second contact hole, wherein an edge of said leveling film at a periphery of said second contact hole is rounded, wherein a surface of said pixel electrode is rounded along the rounded edge of said leveling film.

69. A display device according to claim 68 wherein said organic resin comprises polyimide.

70. A display device according to claim 68 wherein said pixel electrode comprises a transparent conductive film.

71. A display device according to claim 68 wherein said display is a digital gradation display.

72. A television having a display unit and a tuner for receiving television radio wave, said display unit comprising:

at least one thin film transistor formed over a substrate, said thin film transistor having a semiconductor film comprising silicon as an active layer thereof and a gate electrode adjacent to said semiconductor film with a gate insulating film interposed therebetween;

an insulating film over said gate electrode, said insulating film comprising an inorganic material;

a leveling film comprising an organic resin formed over said insulating film; and a pixel electrode formed over said leveling film and electrically connected to said semiconductor film through an opening provided in said leveling film, wherein an edge of said organic resin film at a periphery of said opening is rounded, wherein a surface of said pixel electrode is rounded along the rounded edge of said leveling film.

73. A television according to claim 72 wherein said organic resin comprises polyimide.

74. A television according to claim 72 wherein said pixel electrode comprises a transparent conductive film.

75. A television according to claim 72 wherein said television is a liquid crystal television.

76. A television having a display unit and a tuner for receiving television radio wave, said display unit comprising:

at least one thin film transistor formed over a substrate, said thin film transistor having a semiconductor film comprising silicon as an active layer thereof and a gate electrode adjacent to said semiconductor film with a gate insulating film interposed therebetween;

an insulating film comprising an inorganic material formed over said gate electrode;

a first contact hole in said insulating film;

a wiring formed on said insulating film and electrically connected to said semiconductor film through said first contact hole formed in said insulating film;

a leveling film comprising an organic resin to provide a leveled upper surface over said gate electrode;

a second contact hole through said leveling film; and a pixel electrode formed over said leveled upper surface and electrically connected to said semiconductor film through said second contact hole, wherein an edge of said leveling film at a periphery of said second contact hole is rounded, wherein a surface of said pixel electrode is rounded along the rounded edge of said leveling film.

77. A television according to claim 76 wherein said organic resin comprises polyimide.

78. A television according to claim 76 wherein said pixel electrode comprises a transparent conductive film.

79. A television according to claim 76 wherein said television is a liquid crystal television.

* * * * *

UNITED STATES PATENT AND TRADEMARK OFFICE
CERTIFICATE OF CORRECTION

PATENT NO. : 6,778,231 B1  
DATED : August 17, 2004  
INVENTOR(S) : Shunpei Yamazaki et al.

It is certified that error appears in the above-identified patent and that said Letters Patent is hereby corrected as shown below:

Title page,  
Item [75], Inventors, please delete "; Yasuhiko Takemura, Kanagawa (JP)".

Signed and Sealed this

Twenty-ninth Day of March, 2005

JON W. DUDAS  
*Director of the United States Patent and Trademark Office*